(12) United States Patent
Woo

(10) Patent No.: US 10,615,686 B2
(45) Date of Patent: Apr. 7, 2020

(54) MULTI-LEVEL STEP-UP CONVERTERS WITH FLYING CAPACITOR

(71) Applicant: SILICON WORKS CO., LTD., Daejeon (KR)

(72) Inventor: Young Jin Woo, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/390,511

(22) Filed: Apr. 22, 2019

(65) Prior Publication Data

US 2019/0334433 A1 Oct. 31, 2019

(30) Foreign Application Priority Data

Apr. 25, 2018 (KR) .................. 10-2018-0048068

(51) Int. Cl.
| | | |
|---|---|---|
| *H02M 3/07* | (2006.01) | |
| *H02M 7/483* | (2007.01) | |
| *H02M 3/158* | (2006.01) | |
| *H02M 1/08* | (2006.01) | |

(52) U.S. Cl.
CPC ............... *H02M 3/07* (2013.01); *H02M 1/08* (2013.01)

(58) Field of Classification Search
CPC .. H02M 3/07; H02M 3/073; H02M 2003/077; H02M 2007/4835
See application file for complete search history.

(56) References Cited

U.S. PATENT DOCUMENTS

| | | | |
|---|---|---|---|
| 8,754,874 B2 | 6/2014 | Vieta | |
| 9,748,841 B2 | 8/2017 | Granato et al. | |
| 9,864,463 B2 | 1/2018 | Vukovic et al. | |
| 2008/0239772 A1* | 10/2008 | Oraw ...................... | H02M 3/07 363/60 |
| 2013/0119961 A1* | 5/2013 | Okuda .................. | H02M 3/158 323/299 |
| 2014/0184189 A1* | 7/2014 | Salem ..................... | H02M 3/07 323/299 |
| 2014/0232364 A1* | 8/2014 | Thomas ................ | H02M 7/483 323/271 |
| 2014/0266134 A1* | 9/2014 | Zhak ....................... | H02M 1/36 323/311 |
| 2015/0009734 A1* | 1/2015 | Stahl ..................... | H02M 7/483 363/98 |
| 2015/0171763 A1* | 6/2015 | Kondo .................... | H02M 1/32 363/37 |
| 2015/0280608 A1* | 10/2015 | Yoscovich ............ | H02M 7/483 363/131 |
| 2016/0268924 A1* | 9/2016 | Fu .......................... | H02M 7/483 |
| 2016/0358577 A1* | 12/2016 | Liao ........................ | H02M 3/07 |
| 2017/0250607 A1 | 8/2017 | Zhak et al. | |
| 2018/0026518 A1* | 1/2018 | Liu ........................ | H02M 1/088 323/312 |
| 2019/0058416 A1* | 2/2019 | Wang ..................... | H02M 7/48 |

FOREIGN PATENT DOCUMENTS

JP          2017-098775 A    6/2017

\* cited by examiner

*Primary Examiner* — Jeffrey A Gblende
*Assistant Examiner* — Sisay G Tiku
(74) *Attorney, Agent, or Firm* — Fenwick & West LLP

(57) ABSTRACT

An embodiment provides a technology of sharing electric charges of two or more flying capacitors in a time interval in which a plurality of flying capacitors are floated, so as to control the charging/discharging balance of the flying capacitors, in a step-up converter.

16 Claims, 24 Drawing Sheets

Vin * 2 < Vo

|  | T1 | | | | T2 | | | |
|---|---|---|---|---|---|---|---|---|
|  | TP1 | TP2 | TP3 | TP4 | TP1 | TP2 | TP3 | TP4 |
| Vcf1 > Vcf2 | MD1 | MD2 | MD1 | MD2 | MD1 | MD2 | MD1 | MD2 |
| Vcf1 < Vcf2 | MD1 | MD3 | MD1 | MD3 | MD1 | MD3 | MD1 | MD3 |
| Vcf1 = Vcf2 | MD1 | MD2/MD3 | MD1 | MD2/MD3 | MD1 | MD2/MD3 | MD1 | MD2/MD3 |

Vin < Vo < Vin * 2

|  | T1 | | | | T2 | | | |
|---|---|---|---|---|---|---|---|---|
|  | TP1 | TP2 | TP3 | TP4 | TP1 | TP2 | TP3 | TP4 |
| Vcf1 > Vcf2 | MD2 | MD4 | MD2 | MD4 | MD2 | MD4 | MD2 | MD4 |
| Vcf1 < Vcf2 | MD3 | MD4 | MD3 | MD4 | MD3 | MD4 | MD3 | MD4 |
| Vcf1 = Vcf2 | MD2/MD3 | MD4 | MD2/MD3 | MD4 | MD2/MD3 | MD4 | MD2/MD3 | MD4 |

MULTI-LEVEL STEP-UP CONVERTERS WITH FLYING CAPACITOR

CROSS REFERENCE TO RELATED APPLICATION

This application claims priority from Republic of Korea Patent Application No. 10-2018-0048068, filed on Apr. 25, 2018, which is hereby incorporated by reference for all purposes as if fully set forth herein.

BACKGROUND

1. Field of the Invention

The present disclosure relates to a converter that converts power.

2. Description of the Prior Art

Among converters that convert power, a converter that increases an output voltage to be higher than an input voltage and outputs the increased output voltage is referred to as a step-up converter. In some cases, a step-up converter is also referred to as a boost converter.

In general, a step-up converter has a structure of building up current in an inductor in one time interval corresponding to DT (D is a duty cycle, and T is a switching period) and outputting the built-up current to a load in another time interval corresponding to (1-D)T. In practical implementations, because an inductor current cannot be supplied directly to a load, an output capacitor is inserted between the inductor and the load, and the inductor current is supplied to the load via the output capacitor.

A flying capacitor may be included in the step-up converter to change a voltage ratio of an input voltage and an output voltage. The step-up converter may increase or decrease the voltage ratio while charging or discharging the flying capacitor in each control period.

However, a conventional step-up converter including a flying capacitor has technical difficulties in maintaining the charging/discharging balance of the flying capacitor. There is a problem that an output voltage is abnormally generated if the charging/discharging balance of the flying capacitor is not maintained. In order to solve this problem, the conventional step-up converter receives feedback on the voltage of the flying capacity to perform control, but such a method has problems of a complicated control logic and an additional cost due to necessity of controlling both an output voltage and a flying capacity voltage.

SUMMARY

Based on this background, an aspect of the present embodiment is to provide a step-up converter technology that enables easy control of the charging/discharging balance of a flying capacitor.

In view of the foregoing, an embodiment provides a step-up converter including an inductor unit, a plurality of power switch units, a connection switch unit, and a control unit.

The inductor unit may receive an input voltage in one side thereof, and may include at least one inductor.

Each of the power switch units may include at least four serially connected power switches and at least one flying capacitor connected in parallel to at least two power switches among the at least four power switches, and one node between the at least two power switches may be connected to the other side of the inductor unit.

The connection switch unit may include a plurality of connection switches that connect the at least one flying capacitor of a first power switch unit and the at least one flying capacitor of a second power switch unit from among the plurality of power switch units.

The control unit may control the first power switch unit and the second power switch unit to convert the input voltage into an output voltage, and may allow electric charges of the at least one flying capacitor of the first power switch unit and the at least one flying capacitor of the second power switch unit to be shared in a time interval, during which the at least one flying capacitor floats, in each control period.

The control unit may control the plurality of power switch units so that voltage of the one node changes four times or more in each control period.

In a first time interval of each control period, the at least one flying capacitor of the first power switch unit may be charged, and the at least one flying capacitor of the second power switch unit may be discharged. Further, in a second time interval subsequent to the first time interval, electric charges of the at least one flying capacitor of the first power switch unit and the at least one flying capacitor of the second power switch unit may be shared.

In a third time interval of each control period, the at least one flying capacitor of the first power switch unit may be discharged, and the at least one flying capacitor of the second power switch unit may be charged. Further, in a fourth time interval subsequent to the third time interval, electric charges of the at least one flying capacitor of the first power switch unit and the at least one flying capacitor of the second power switch unit may be shared.

A charging amount of the at least one flying capacitor of the first power switch unit in the first time interval and a discharging amount of the at least one flying capacitor of the first power switch unit in the third time interval may not match.

In a time interval during which electric charges of the at least one flying capacitor are shared, voltage substantially corresponding to ½ of an output voltage may be generated in the at least one flying capacitor.

In one mode, the at least one flying capacitor of the first power switch unit may be charged, and the at least one flying capacitor of the second power switch unit may be discharged. Further, in another mode, the at least one flying capacitor of the first power switch unit may be discharged, and the at least one flying capacitor of the second power switch unit may be charged.

When voltage of the at least one flying capacitor of the first power switch unit is higher than voltage of the at least one flying capacitor of the second power switch unit, the control unit may perform control so that the one mode is not applied in one control period or an application time of the another mode is longer than an application time of the one mode.

The control unit may control a sequence, time, or frequency of applying the one mode and the another mode to be different in the first control period and the second control period, and may control the time or frequency of applying the one mode and the another mode to be the same in a plurality of control periods including the first control period and the second control period.

Another embodiment provides a step-up converter including an inductor unit, a first switch unit, a second switch unit, a third switch unit, and a control unit.

The inductor unit may receive an input voltage in one side thereof, and may include at least one inductor.

The first switch unit may include a first switch, a second switch, a third switch, and a fourth switch which are connected in series, and may include a first flying capacitor connected in parallel to the second switch and the third switch, wherein one node between the second switch and the third switch may be connected to the inductor unit.

The second switch unit may include a fifth switch, a sixth switch, a seventh switch, and an eighth switch which are connected in series, and may include a second flying capacitor connected in parallel to the sixth switch and the seventh switch, wherein another node between the sixth switch and the seventh switch may be connected to the inductor unit.

The third switch unit may include a ninth switch and a tenth switch which connect both ends of the first flying capacitor and the second flying capacitor.

The control unit may control the first power switch unit and the second power switch unit to convert the input voltage into an output voltage, and may allow electric charges of the first flying capacitor and the second flying capacitor to be shared in a time interval, during which the first flying capacitor and the second flying capacitor float, in each period.

A ground voltage and the output voltage may be generated at both ends of the first switch unit, a first flying capacitor voltage may be generated in the first flying capacitor, and the control unit may control the first switch unit so as to generate, in the one node, voltage of multiple levels including a level of the ground voltage, a level obtained by subtracting the first flying capacitor voltage from the output voltage, and a level obtained by adding the first flying capacitor voltage to the ground voltage.

When the voltage having the level of the ground voltage is generated in the one node, the control unit may control the third switch unit to allow electric charges of the first flying capacitor and the second flying capacitor to be shared.

A ground voltage and the output voltage may be generated at both ends of the first switch unit, a first flying capacitor voltage may be generated in the first flying capacitor, and the control unit may control the first switch unit so as to generate, in the one node, voltage of multiple levels including a level of the output voltage, a level obtained by subtracting the first flying capacitor voltage from the output voltage, and a level obtained by adding the first flying capacitor voltage to the ground voltage.

The first switch and the fifth switch may be connected to an output capacitor, and the fourth switch and the eighth switch may be connected to the ground. The control unit may divide each control period sequentially into a first time interval, a second time interval, a third time interval, and a fourth time interval so as to control the same. In the first time interval and the third time interval, the control unit may turn on the third switch, the fourth switch, the seventh switch, the eighth switch, the ninth switch, and the tenth switch, and may turn off the first switch, the second switch, the fifth switch, and the sixth switch. In the second time interval, the control unit may turn on the first switch, the third switch, the sixth switch, and the eighth switch, and may turn off the second switch, the fourth switch, the fifth switch, the seventh switch, the ninth switch, and the tenth switch. In the fourth time interval, the control unit may turn on the second switch, the fourth switch, the fifth switch, and the seventh switch, and may turn off the first switch, the third switch, the sixth switch, the eighth switch, the ninth switch, and the tenth switch.

The first switch and the fifth switch may be connected to an output capacitor, and the fourth switch and the eighth switch may be connected to the ground. The control unit may divide each control period sequentially into a first time interval, a second time interval, a third time interval, and a fourth time interval so as to control the same. In the first time interval, the control unit may turn on the first switch, the third switch, the sixth switch, and the eighth switch, and may turn off the second switch, the fourth switch, the fifth switch, the seventh switch, the ninth switch, and the tenth switch. In the third time interval, the control unit may turn on the second switch, the fourth switch, the fifth switch, and the seventh switch, and my turn off the first switch, the third switch, the sixth switch, the eighth switch, the ninth switch, and the tenth switch. In the second time interval and the fourth time interval, the control unit may turn on the first switch, the second switch, the fifth switch, the sixth switch, the ninth switch, and the tenth switch, and may turn off the third switch, the fourth switch, the seventh switch, and the eighth switch.

In one mode, the first flying capacitor of the first switch unit is charged, and the second flying capacitor of the second switch unit may be discharged. Further, in another mode, the first flying capacitor of the first switch unit is discharged, and the second flying capacitor of the second switch unit may be charged.

When voltage of the first flying capacitor is lower than voltage of the second flying capacitor, the control unit may perform control so that the another mode is not applied in one control period or an application time of the one mode is longer than an application time of the another mode.

When a difference between the voltage of the first flying capacitor and the voltage of the second flying capacitor falls within a predetermined range, the control unit may control a sequence, time, or frequency of applying the one mode and the another mode to be different in the first control period and the second control period, and may control the time or frequency of applying the one mode and the another mode to be the same in a plurality of control periods including the first control period and the second control period.

Another embodiment provides a step-up converter including an inductor unit, a plurality of power switch units, and a control unit.

The inductor unit may receive an input voltage in one side thereof, and may include at least one inductor.

Each of the power switch units may include at least four serially connected power switches and at least one flying capacitor connected in parallel to at least two power switches among the at least four power switches, and one node between the at least two power switches may be connected to the other side of the inductor unit.

The control unit may control the first power switch unit and the second power switch unit to convert the input voltage into an output voltage, may allow the at least one flying capacitor of the first power switch unit to be charged and the at least one flying capacitor of the second power switch unit to be discharged in one mode, and may allow the at least one flying capacitor of the first power switch unit to be discharged and the at least one flying capacitor of the second power switch unit to be charged in another mode. Further, when voltage of the at least one flying capacitor of the first power switch unit is higher than voltage of the at least one flying capacitor of the second power switch unit, the control unit may perform control so that the one mode is not applied in one control period, or an application time of the another mode is longer than an application time of the one mode.

In one mode, the first flying capacitor of the first switch unit is charged, and the second flying capacitor of the second switch unit may be discharged. Further, in another mode, the first flying capacitor of the first switch unit is discharged, and the second flying capacitor of the second switch unit may be charged.

When a difference between voltage of the at least one flying capacitor of the first power switch unit and voltage of the at least one flying capacitor of the second power switch unit falls within a predetermined range, the control unit may control a sequence, time, or frequency of applying the one mode and the another mode to be different in the first control period and the second control period, and may control the time or frequency of applying the one mode and the another mode to be the same in a plurality of control periods including the first control period and the second control period.

As described above, according to the embodiments, the charging/discharging balance of flying capacitors used in the step-up converter can be easily controlled.

BRIEF DESCRIPTION OF THE DRAWINGS

The above and other aspects, features and advantages of the present disclosure will be more apparent from the following detailed description taken in conjunction with the accompanying drawings, in which:

FIG. 24 is a diagram illustrating an example of a mode applied to the power stage according to the second example of another embodiment.

DETAILED DESCRIPTION OF THE EXEMPLARY EMBODIMENTS

Figure 1:
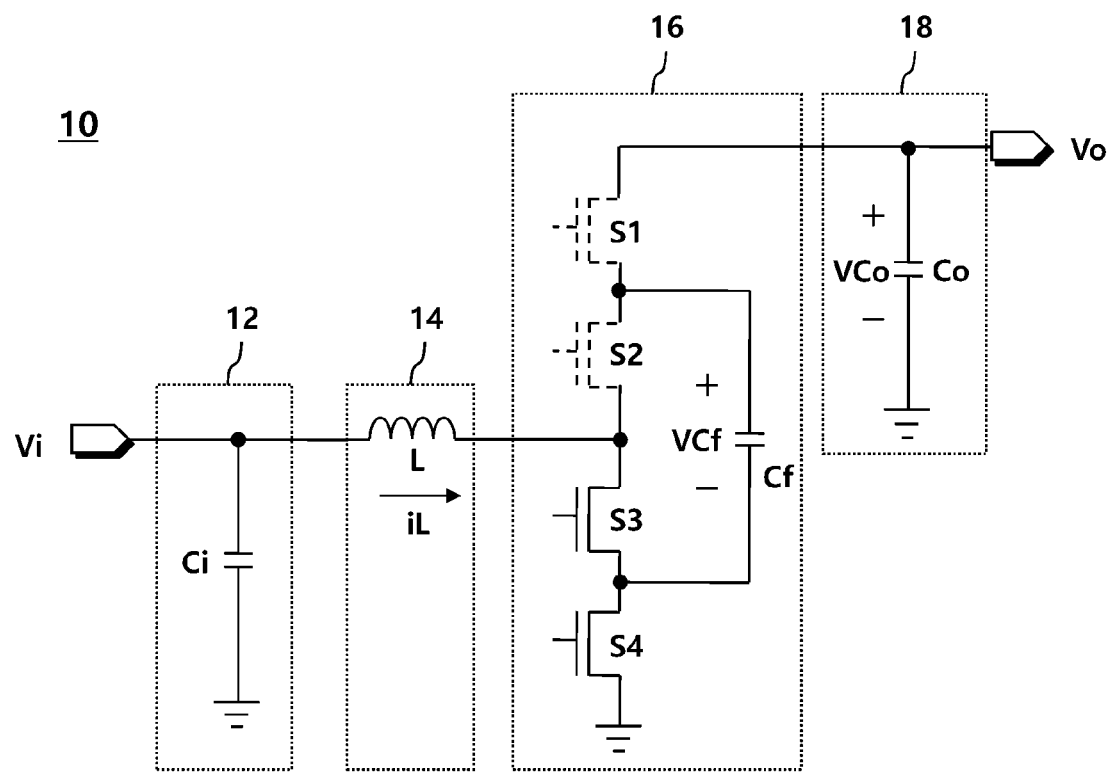
FIG. 1 is a state diagram illustrating a first time interval of a general multilevel step-up converter.

Hereinafter, embodiments of the present disclosure will be described in detail with reference to the accompanying drawings. In adding reference numerals to elements in each drawing, the same elements will be designated by the same reference numerals as far as possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence or the like of a corresponding structural element are not limited by the term. When it is described in the specification that one component is "connected," "coupled" or "joined" to another component, it should be read that the first component may be directly connected, coupled or joined to the second component, but also a third component may be "connected," "coupled," and "joined" between the first and second components.

Figure 2:
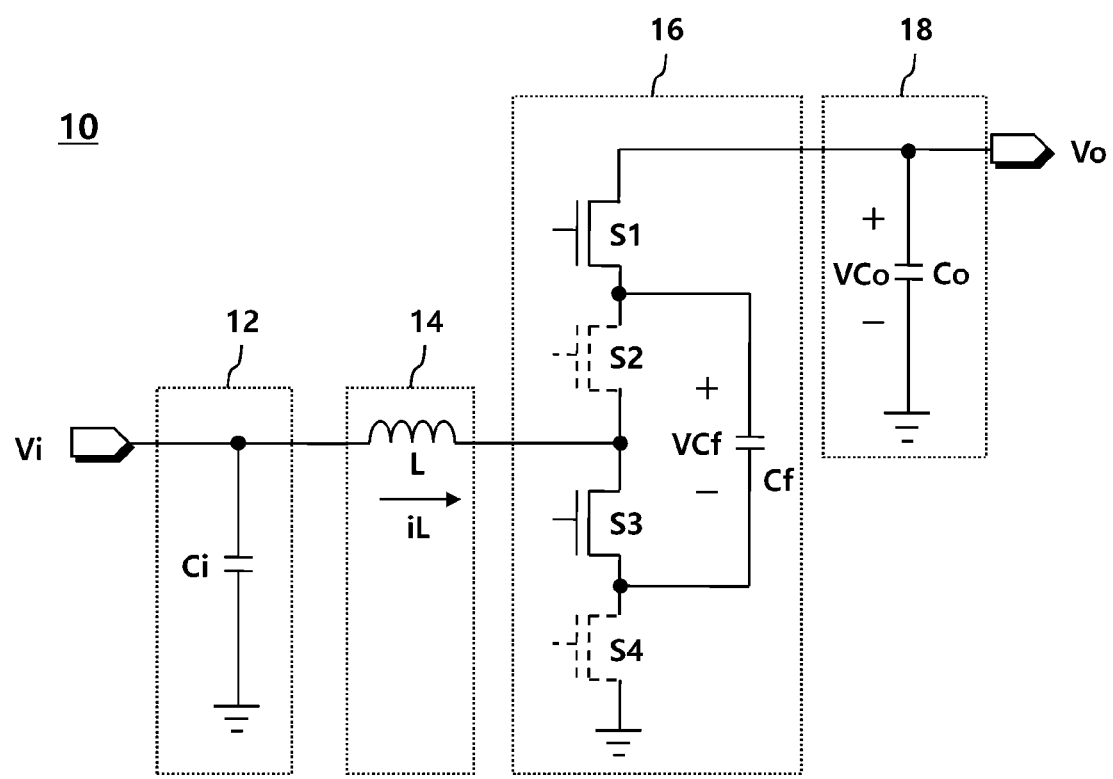
FIG. 2 is a state diagram illustrating a second time interval of the general multilevel step-up converter.
Figure 3:
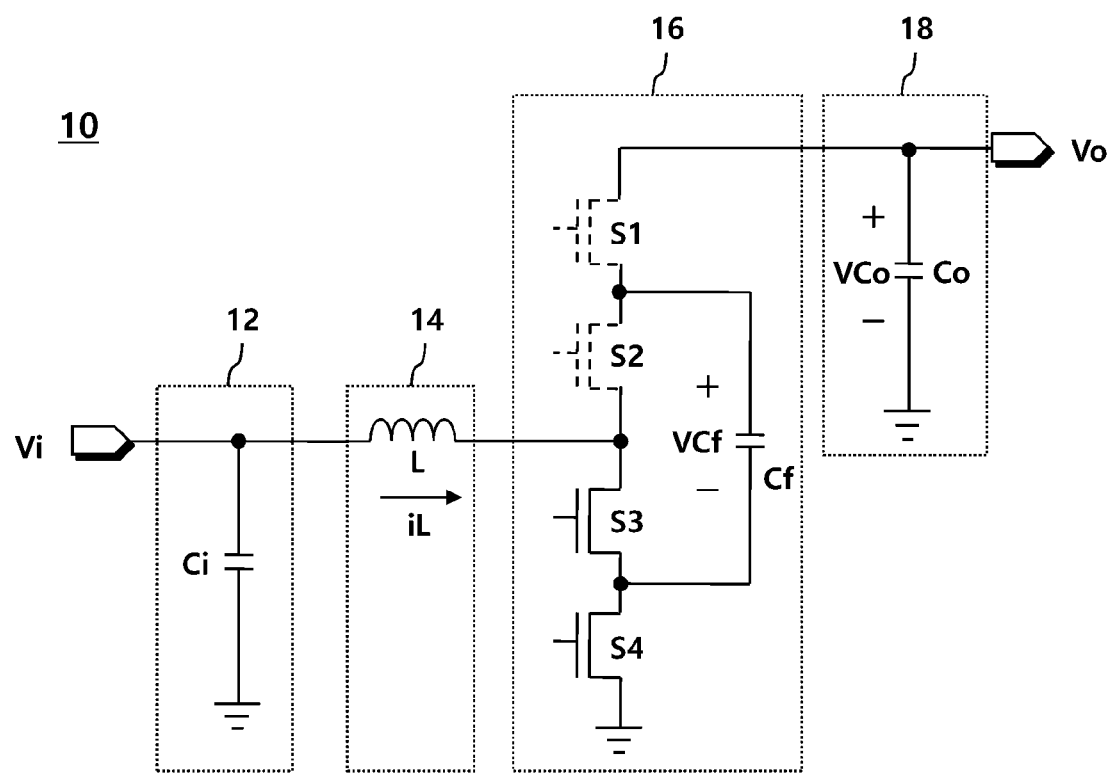
FIG. 3 is a state diagram illustrating a third time interval of the general multilevel step-up converter.
Figure 4:
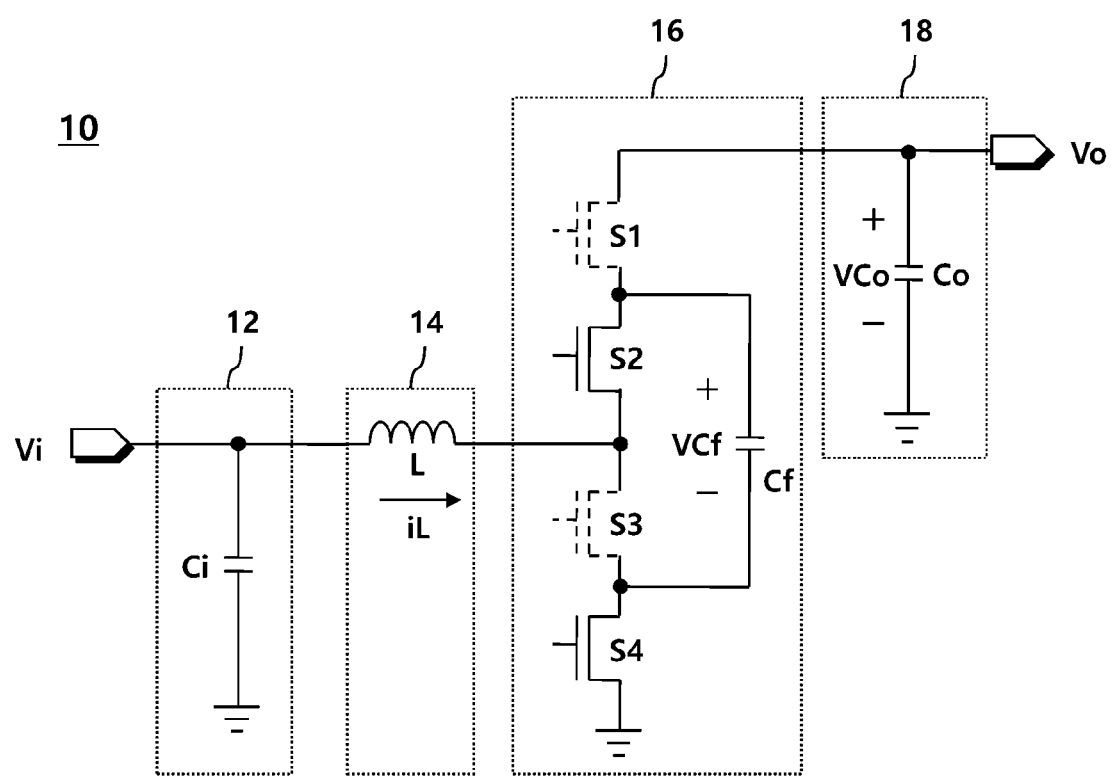
FIG. 4 is a state diagram illustrating a fourth time interval of the general multilevel step-up converter.

FIG. 1 is a state diagram illustrating a first time interval of a general multilevel step-up converter, and FIG. 2 is a state diagram of a second time interval of the general multilevel step-up converter. FIG. 3 is a state diagram illustrating a third time interval of the general multilevel step-up converter, and FIG. 4 is a state diagram of a fourth time interval of the general multilevel step-up converter.

Referring to FIG. 1 to FIG. 4, the general multilevel step-up converter 10 includes an input unit 12, an inductor unit 14, a switch unit 16, and an output unit 18.

The input unit 12 includes an input capacitor Ci that receives an input voltage (Vi).

The inductor unit 14 includes an inductor L, wherein one side of the inductor L is connected to the input capacitor Ci, and the other side of the inductor L is connected to the switch unit 16.

The switch unit 16 includes four switches S1, S2, S3, and S4, and a flying capacitor Cf, wherein a node connected to the second switch S2 and the third switch S3 is connected to the other side of the inductor (L), and both ends of the flying capacitor Cf are connected to a node between the first switch S1 and the second switch S2 and a node between the third switch S3 and the fourth switch S4, respectively.

The output unit 18 includes an output capacitor Co, and the output capacitor Co is connected to the first switch S1.

The multilevel step-up converter 10 turns on the third switch S3 and the fourth switch S4 in a first time interval (TP1) of a control period, so as to build up current (iL) in the inductor L. The multilevel step-up converter 10 turns on the first switch S1 and the third switch S3 in a second time interval (TP2), so as to transfer the current (iL) of the inductor L to the output capacitor Co via the flying capacitor Cf.

The multilevel step-up converter 10 turns on the third switch S3 and the fourth switch S4 in a third time interval (TP3) of the control period, so as to build up the current (iL) in the inductor L. The multilevel step-up converter 10 turns on the second switch S2 and the fourth switch S4 in a fourth time interval (TP4), so as to transfer the current (iL) of the inductor L to the ground via the flying capacitor Cf.

For the general multilevel step-up converter 10, the flying capacitor Cf is discharged in the second time interval (TP2) of the control period, and the flying capacitor Cf is charged in the fourth time interval (TP4). However, at this time, if a charging amount and a discharging amount of the flying capacitor Cf do not match, voltage of the flying capacitor Cf in each control period is generated differently so that a problem in that control or an output voltage (Vo) becomes unstable occurs.

Figure 5:
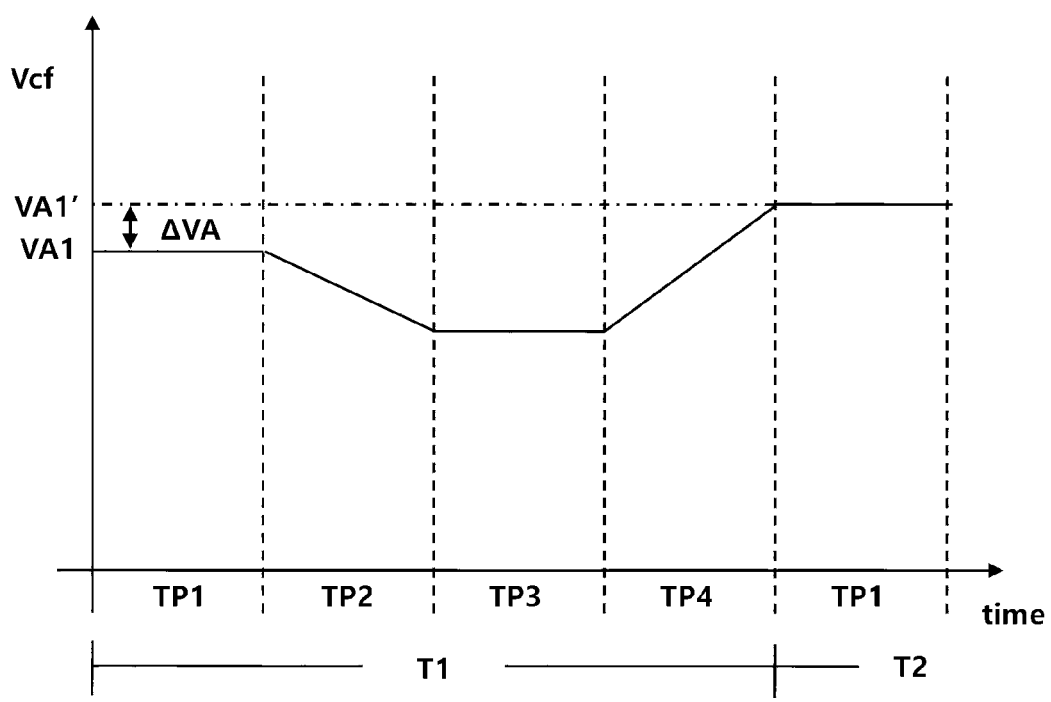
FIG. 5 is a waveform diagram for voltage of a flying capacitor in the general multilevel step-up converter.

FIG. 5 is a waveform diagram for voltage of a flying capacitor in the general multilevel step-up converter.

Referring to FIG. 1 to FIG. 5, because the flying capacitor Cf floats in the first time interval (TP1), a constant voltage (VA) is maintained. As the flying capacitor Cf is discharged by the inductor current (iL) in the second time interval (TP2), voltage (Vcf) thereof becomes smaller.

The flying capacitor Cf is floated again in the third time interval (TP3) and thus voltage determined at a last moment of the second time interval (TP2) is maintained. The flying capacitor Cf is charged by the inductor current (iL) in the fourth time interval (TP4), and the the voltage (Vcf) thereof becomes large.

In this procedure, if a mismatch occurs between a discharging amount in the second time interval (TP2) and a charging amount in the fourth time interval (TP4), there occurs, as illustrated in FIG. 5, a problem in that a voltage difference (ΔVA) is generated between voltage (VA) in the first time interval (TP1) of a first control period (T1) and voltage (VA') in the first time interval (TP1) of a second control period (T2), in the voltage (Vcf) of the flying capacitor.

If voltage of a flying capacitor is generated differently in each control period, a control or an output voltage may be unstable. However, the step-up converter according to an embodiment of the present disclosure proposes a structure that enables an easy control of the charging/discharging balance of a flying capacitor so as to prevent the occurrence of such a problem.

Figure 6:
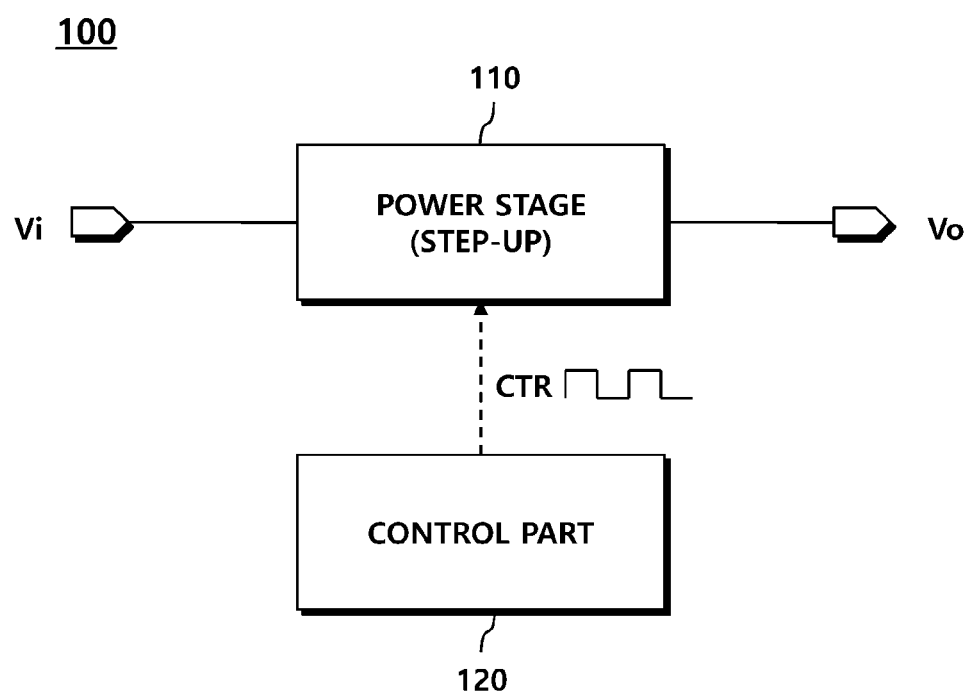
FIG. 6 is a configuration diagram of a step-up converter to which embodiments can be applied.

FIG. 6 is a configuration diagram of a step-up converter to which embodiments can be applied.

Referring to FIG. 6, a step-up converter 100 may include a power stage 110 and a control unit (part) 120.

The power stage 110 may include an inductor and a plurality of switches.

The control unit 120 may transmit a control signal CTR to the power stage 110 so as to control the on/off of the plurality of switches. The power stage 110 may be operated as a multilevel step-up converter depending on the on/off of the switches.

The power stage 110 may be operated as a multilevel step-up converter, and may generate an output voltage (Vo) to be higher than an input output (Vi).

Hereinafter, the configuration and state of the power stage 110 will be mainly described, and it may be understood that the switches of the power stage 110 are controlled by the control unit 120.

Figure 7:
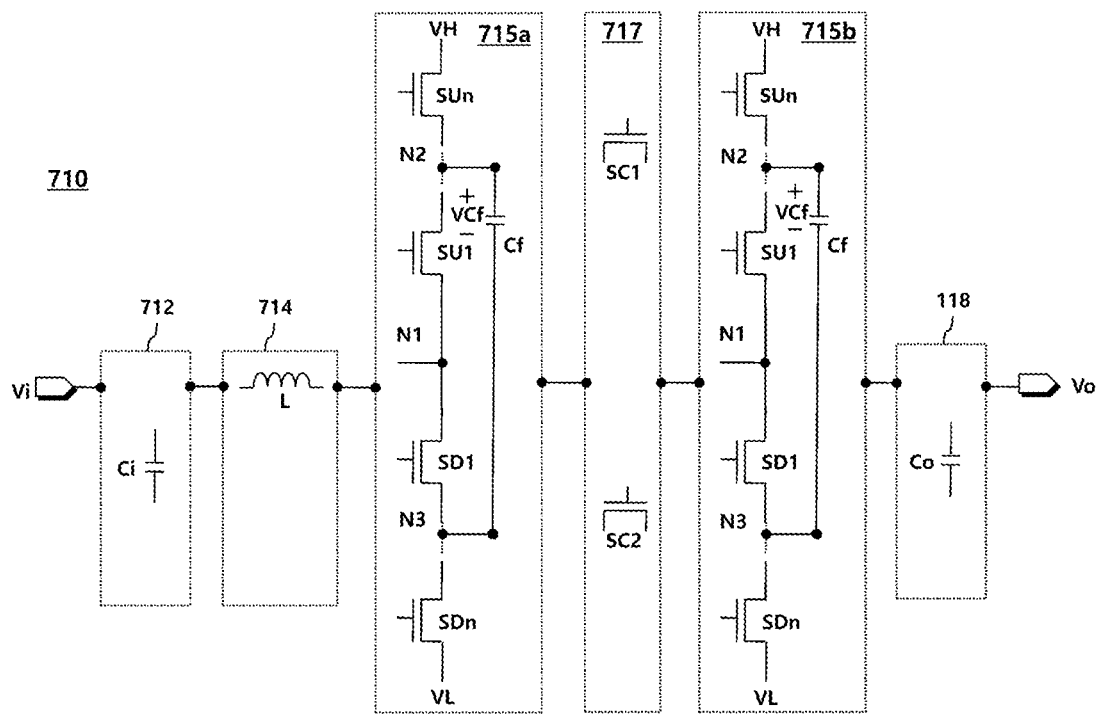
FIG. 7 is a first exemplary configuration diagram illustrating a power stage of a step-up converter according to an embodiment.

FIG. 7 is a first exemplary configuration diagram illustrating a power stage of a step-up converter according to an embodiment.

Referring to FIG. 7, a power stage 710 may include an input unit 712, an inductor unit 714, a plurality of power switch units 715a and 715b, a connection switch unit 717, an output unit 118, and the like.

The input unit 712 may include at least one input capacitor Ci. An input voltage (Vi) is supplied to one side of the input capacitor Ci, and the other side of the input capacitor Ci may be connected to the ground.

The inductor unit 714 may include at least one inductor L. One side of the inductor unit 714 is connected to the input unit 712, and the input voltage (Vi) may be received from the input unit 712.

The power switch unit 715a or 715b may include at least four serially connected power switches SU1 to SUn and SD1 to SDn. The power switch unit 715a or 715b may include at least two power switches SU1 to SUn on the high voltage side and may include at least two power switches SD1 to SDn on the low voltage side with respect to a first node N1 connected to the inductor unit 714.

One end of the at least four serially connected power switches SU1 to SUn and SD1 to SDn may be connected to a high voltage (VH) and the other end thereof may be connected to a low voltage (VL). The high voltage (VH) may be an output voltage (Vo) and the low voltage (VL) may be the ground voltage. In the present specification, the ground voltage may be understood as an example of the low voltage (VL) described above.

One side of the inductor unit 714 may be connected to the input unit 712, and the other side may be connected to the first node N1 of the power switch unit 715a or 715b. For example, one side of the inductor L included in the inductor unit 714 may be connected to the input unit 712, and the other side may be connected to the first node N1 of the power switch unit 715a or 715b.

The power switch unit 715a or 715b may include at least one flying capacitor Cf. The flying capacitor Cf may be connected in parallel to at least two power switches among the at least four power switches SU1 to SUn and SD1 to SDn included in the power switch unit 715a or 715b. For example, both ends of the flying capacitor Cf may be connected to a second node N2 formed between the at least two power switches SU1 to SUn disposed on the high voltage side, and may be connected to a third node N3 formed between the at least two power switches SD1 to SDn disposed on the low voltage side with respect to the first node N1. According to this connection, the flying capacitor Cf may be connected in parallel to a plurality of switches disposed between the second node N2 and the third node N3. Further, the first node N1 formed between the switches connected in parallel to the flying capacitor Cf may be connected to the other side of the inductor unit 714.

The connection switch unit 717 may include a plurality of connection switches SC1 and SC2 that connect flying capacitors Cf. For example, the connection unit 717 may include the plurality of connection switches SC1 and SC2 that connect at least one flying capacitor Cf of the first power switch unit 715a and at least one flying capacitor Cf of the second power switch unit 715b among the plurality of power switch units 715a and 715b.

In the connection switch unit 717, the first connection switch SC1 may be connected to one side of the flying capacitors Cf of the respective power switch units 715a and 715b, and the second connection switch SC2 may be connected to the other side of the flying capacitors Cf. When the first connection switch SC1 and the second connection SC2 are turned on, the flying capacitors Cf of the respective power switch units 715a and 715b may be connected in parallel to each other.

The output unit 118 may include an output capacitor Co. An output voltage (Vo) is supplied to one side of the output capacitor Co, and the other side of the output capacitor Co may be connected to the ground.

The control unit (refer to reference numeral 120 in FIG. 6) may control the plurality of power switch units 715a and 715b so as to convert the input voltage (Vi) into the output voltage (Vo).

The control unit (refer to reference numeral 120 in FIG. 6) may control, in each control period, the plurality of power switch units 715a and 715b so that voltage of the first node N1 changes four times or more.

As a first exemplary control, the control unit (refer to reference numeral 120 in FIG. 6) may generate a low voltage (VL) in the first node N1 in the first time interval, and may generate, in the first node N1, voltage obtained by subtracting the voltage (Vcf) of the flying capacitor from a high voltage (VH) in the second time interval. The control unit (refer to reference numeral 120 in FIG. 6) may generate the low voltage (VL) in the first node N1 in the third time interval, and may generate, in the first node N1, voltage obtained by adding the voltage (Vcf) of the flying capacitor to the low voltage (VL) in the fourth time interval. Herein, the high voltage (VH) may be the output voltage (Vo) and the low voltage (VL) may the ground voltage.

As a second exemplary control, the control unit (refer to reference numeral 120 in FIG. 6) may generate a low voltage (VL) in the first node N1 in the first time interval, and may generate, in the first node N1, voltage obtained by adding the voltage (Vcf) of the flying capacitor to the low voltage (VL) in the second time interval. The control unit (refer to reference numeral 120 in FIG. 6) may generate the low voltage (VL) in the first node N1 in the third time interval, and may generate, in the first node N1, voltage obtained by subtracting the voltage (Vcf) of the flying capacitor from the high voltage (VH) in the fourth time interval. Herein, the high voltage (VH) may be the output voltage (Vo) and the low voltage (VL) may be the ground voltage.

As a third exemplary control, the control unit (refer to reference numeral 120 in FIG. 6) may generate voltage obtained by subtracting the voltage (Vcf) of the flying capacitor from a high voltage (VH) in the first node N1 in the first time interval, and may generate the high voltage (VH) in the first node N1 in the second time interval. The control unit (refer to reference numeral 120 in FIG. 6) may generate, in the first node N1, voltage obtained by adding the voltage (Vcf) of the flying capacitor to a low voltage (VL) in the third time interval, and may generate the high voltage (VH) in the first node N1 in the fourth time interval. Herein, the high voltage (VH) may be the output voltage (Vo) and the low voltage (VL) may be the ground voltage.

As a fourth exemplary control, the control unit (refer to reference numeral 120 in FIG. 6) may generate, in the first node N1, voltage obtained by adding the voltage (Vcf) of the flying capacitor to a low voltage (VL) in the first time interval, and may generate a high voltage (VH) in the first node N1 in the second time interval. The control unit (refer to reference numeral 120 in FIG. 6) may generate, in the first node N1, voltage obtained by subtracting the voltage (Vcf) of the flying capacitor from the high voltage (VH) in the third time interval, and may generate the high voltage (VH) in the first node N1 in the fourth interval. Herein, the high voltage (VH) may be the output voltage (Vo) and the low voltage (VL) may be the ground voltage.

In this control, the flying capacitor Cf may be floated in one time interval of each control period. Here, being floated refers to a state in which one end of the flying capacitor Cf is disconnected from a contact point, and the contact point may be, for example, the first node N1, a low voltage (VL) source, a high voltage (VH) source, and the like.

The control unit (refer to reference numeral 120 in FIG. 6) may allow electric charges of the plurality of flying capacitors Cf to be shared in a time interval of each control period, in which the flying capacitors Cf are floated. For example, the control unit (refer to reference numeral 120 in FIG. 6) may allow electric charges of at least one flying capacitor Cf of the first power switch unit 715a and at least one floating capacitor Cf of the second power switch unit 715b to be shared in the in a time interval of each control period, in which the flying capacitor Cf is floated. The charging/discharging balance of the flying capacitors Cf may be easily controlled by sharing of the electric charges of the plurality of flying capacitors Cf.

Sharing of the electric charges between the plurality of flying capacitors Cf may be performed by controlling of the connection switch unit 717. The control unit (refer to reference numeral 120 in FIG. 6) may turn on the plurality of connection switches SC1 and SC2 included in the connection switch unit 717 so as to allow electric charges of at least one flying capacitor Cf of the first power switch unit 715a and at least one floating capacitor Cf of the second power switch unit 715b to be shared.

The control unit (refer to reference numeral 120 in FIG. 6) may control the direction of a charging/discharging current of the floating capacitor Cf differently with respect to the plurality of power switch units 715a and 715b.

For example, the control unit (refer to reference numeral 120 in FIG. 6) may allow the flying capacitor Cf to be discharged in the second time interval by controlling the first power switch unit 715a in the same manner as that described in the first exemplary control, and may allow the flying capacitor Cf to be charged in the second time interval by controlling the second power switch unit 715b in the same manner as that described in the second exemplary control. The control unit (refer to reference numeral 120 in FIG. 6) may allow electric charges of the flying capacitor Cf of the first power switch unit 715a and the flying capacitor Cf of the second power switch unit 715b to be shared in the third time interval subsequent to the second time interval.

The control unit (refer to reference numeral 120 in FIG. 6) may allow the flying capacitor Cf to be charged in the fourth time interval by controlling the first power switch unit 715a in the same manner as that described in the first exemplary control, and may allow the flying capacitor Cf to be discharged in the fourth time interval by controlling the second power switch unit 715b in the same manner as that described in the second exemplary control. The control unit (refer to reference numeral 120 in FIG. 6) may allow electric charges of the flying capacitor Cf of the first power switch unit 715a and the flying capacitor Cf of the second power switch unit 715b to be shared in the first time interval subsequent to the fourth time interval.

In this control, the control unit (refer to reference numeral 120 in FIG. 6) may easily control the charging/discharging balance of each control period for the flying capacitor Cf by allowing electric charges of the plurality of flying capacitors Cf, the charging/discharging current directions of which are controlled differently, to be shared.

Depending on a control method, the control unit (refer to reference numeral 120 in FIG. 6) may control the voltage (Vcf) of the flying capacitor to be ½ of the output voltage (Vo). However, the voltage (Vcf) of the flying capacitor may become higher or lower than ½ of the output voltage (Vo) in a time interval in which the floating capacitor Cf is charged or discharged, and the voltage (Vcf) of the flying capacitor may become substantially the same as ½ of the output voltage (Vo) in the time interval in which electric charges are shared, in the described control method.

Figure 8:
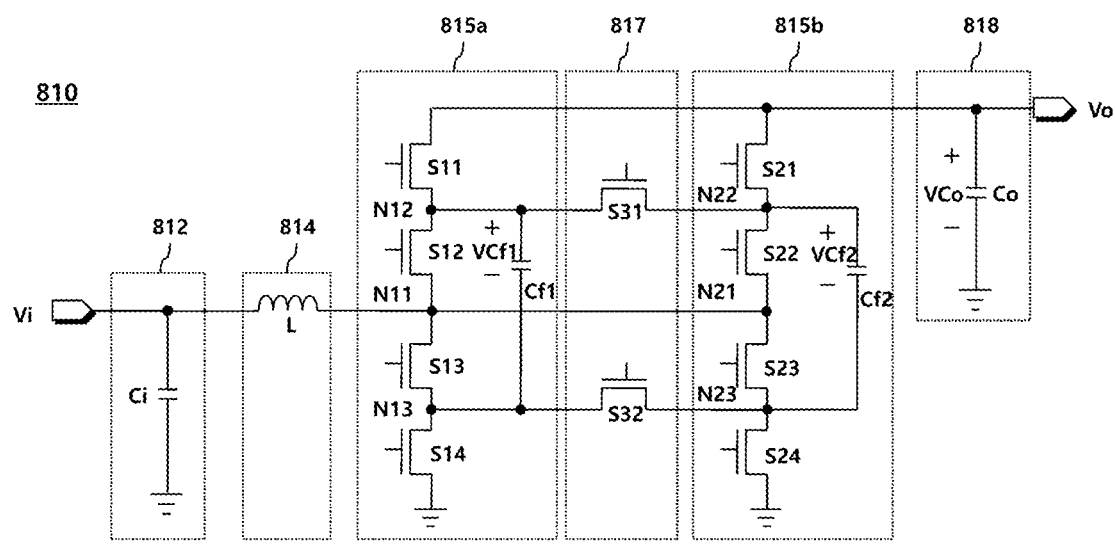
FIG. 8 is a second exemplary configuration diagram illustrating a power stage of a step-up converter according to an embodiment.

FIG. 8 is a second exemplary configuration diagram illustrating a power stage of a step-up converter according to an embodiment.

Referring to FIG. 8, a power stage 810 may include an input unit 812, an inductor unit 814, a first switch unit 815a, a second switch unit 815b, a third switch unit 817, an output unit 818, and the like.

The input unit 812 may include at least one input capacitor Ci. An input voltage (Vi) is supplied to one side of the input capacitor Ci, and the other side of the input capacitor Ci may be connected to the ground.

The output unit 818 may include at least one output capacitor Co. An output voltage (Vo) is supplied to one side of the output capacitor Co, and the other side of the output capacitor Co may be connected to the ground.

The inductor unit 814 may include at least one inductor L. One side of the inductor unit L may be connected to the input capacitor Ci so as to receive an input voltage (Vi), and the other side of the inductor unit (L) may be connected to a first node N11 and a fourth node N21.

The first switch unit 815a may include four serially connected switches S11 to S14. The first switch unit 815a may include a first flying capacitor Cf1 connected in parallel to the second switch S12 and the third switch S13.

One side of the first switch S11 may be connected to an output capacitor Co and the other side may be connected to the second node N12. One side of the second switch S12 may be connected to the second node N12, and the other side may be connected to the first node N11. One side of the third switch S13 may be connected to the first node N11, and the other side may be connected to a third node N13. One side of the fourth switch S14 may be connected to the third node N13, and the other side may be connected to the ground.

The second switch unit 815b may include four serially connected switches S21 to S24. The second switch unit 815b may include a second flying capacitor Cf2 connected in parallel to a sixth switch S22 and a seventh switch S23.

One side of the fifth switch S21 may be connected to the output capacitor Co and the other side may be connected to a fifth node N22. One side of the sixth switch S22 may be connected to the fifth node N22, and the other side may be connected to the fourth node N21. One side of the seventh switch S23 may be connected to the fourth node N21, and the other side may be connected to a sixth node N23. One side of an eighth switch S24 may be connected to the sixth node N23, and the other side may be connected to the ground.

The third switch unit 817 may include a ninth switch S31 that connects the first flying capacitor Cf1 and both ends of the second flying capacitor Cf2, and a tenth switch S32.

When a terminal connected to the second node N12 is referred to as a positive terminal and a terminal connected to the third node N13 is referred to as a negative terminal in the first flying capacitor Cf1, and when a terminal connected to the fifth node N22 is referred to as a positive terminal and a terminal connected to the sixth node N23 is referred to as a negative terminal in the second flying capacitor Cf2, the ninth switch S31 may connect the positive terminal of the first flying capacitor Cf1 and the positive terminal of the second flying capacitor Cf2, and the tenth switch S32 may connect the negative terminal of the first flying capacitor Cf1 and the negative terminal of the second flying capacitor Cf2.

Figure 9:
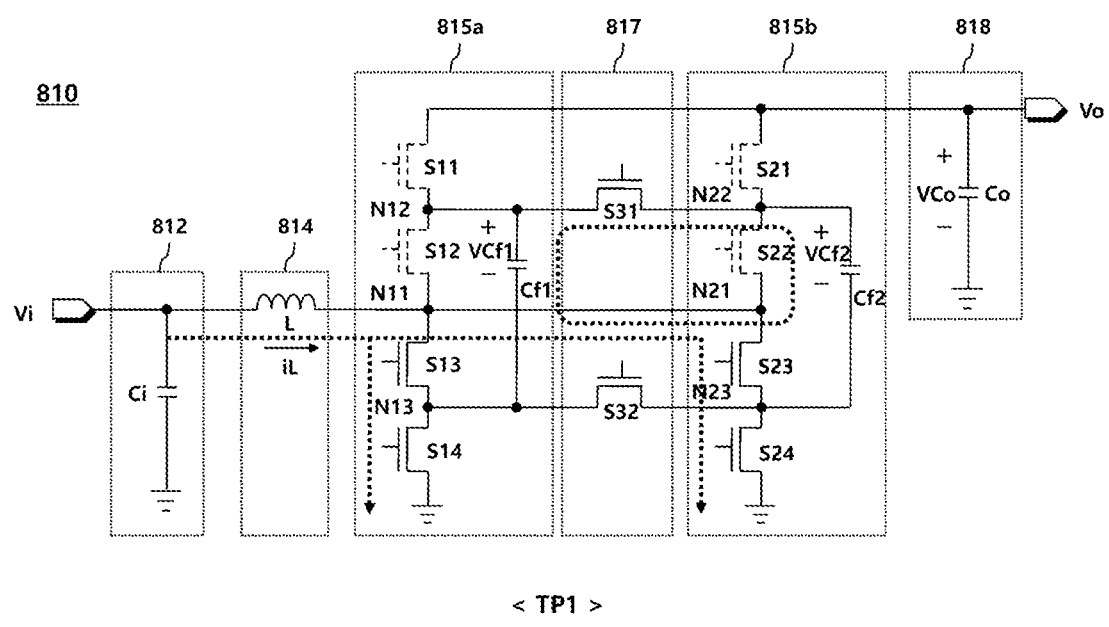
FIG. 9 is a first time interval state diagram illustrating a time at which the power stage according to a second example of an embodiment is controlled by a first control method.
Figure 10:
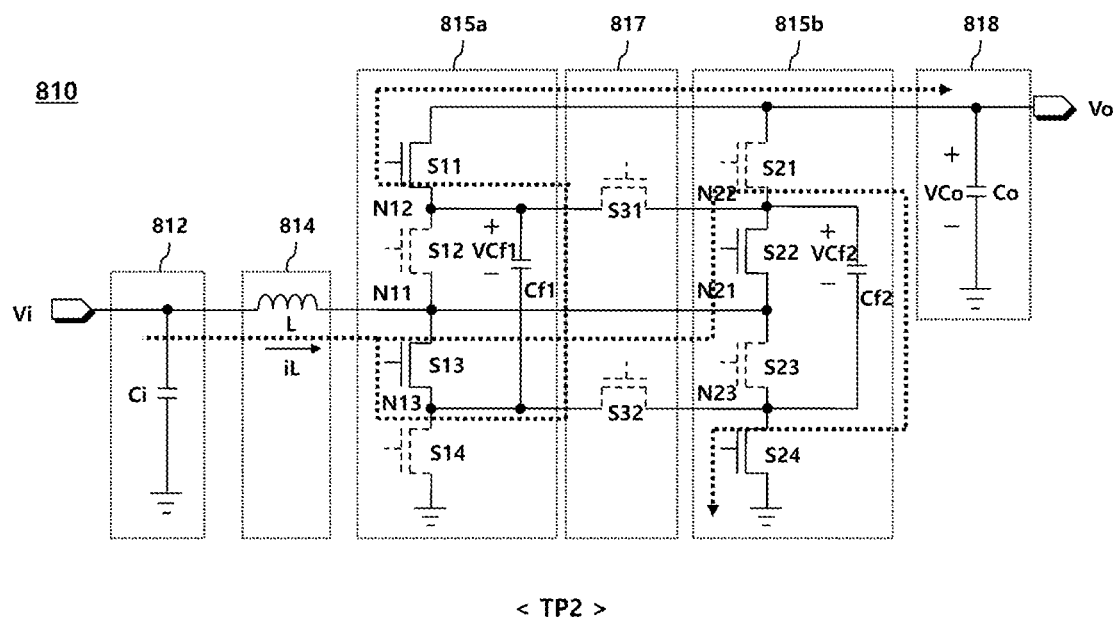
FIG. 10 is a second time interval state diagram illustrating the time at which the power stage according to the second example of the embodiment is controlled by the first control method.
Figure 11:
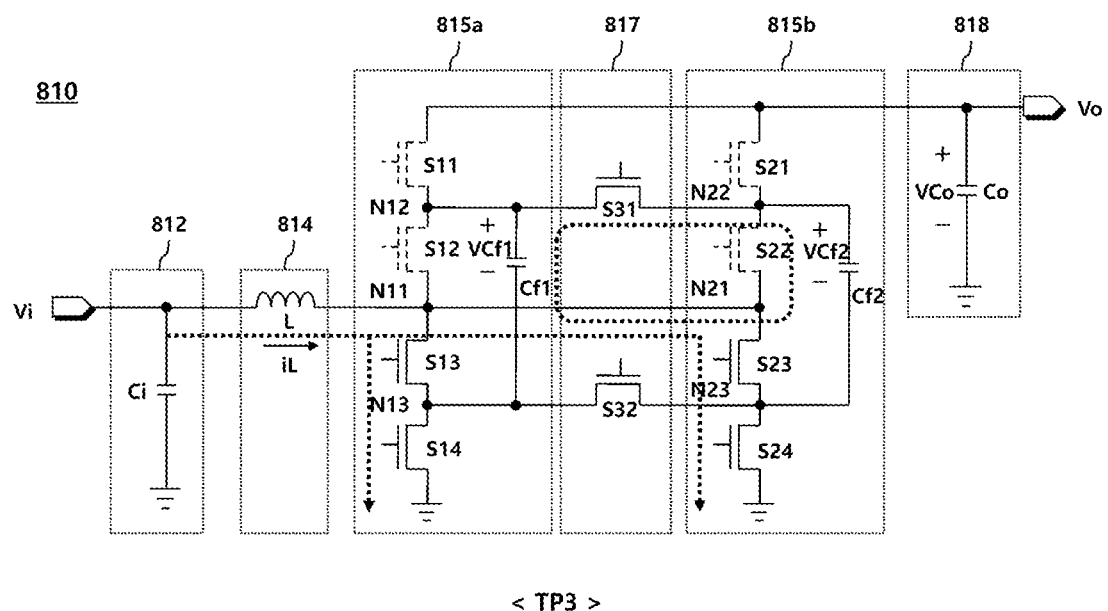
FIG. 11 is a third time interval state diagram illustrating the time at which the power stage according to the second example of the embodiment is controlled by the first control method.
Figure 12:
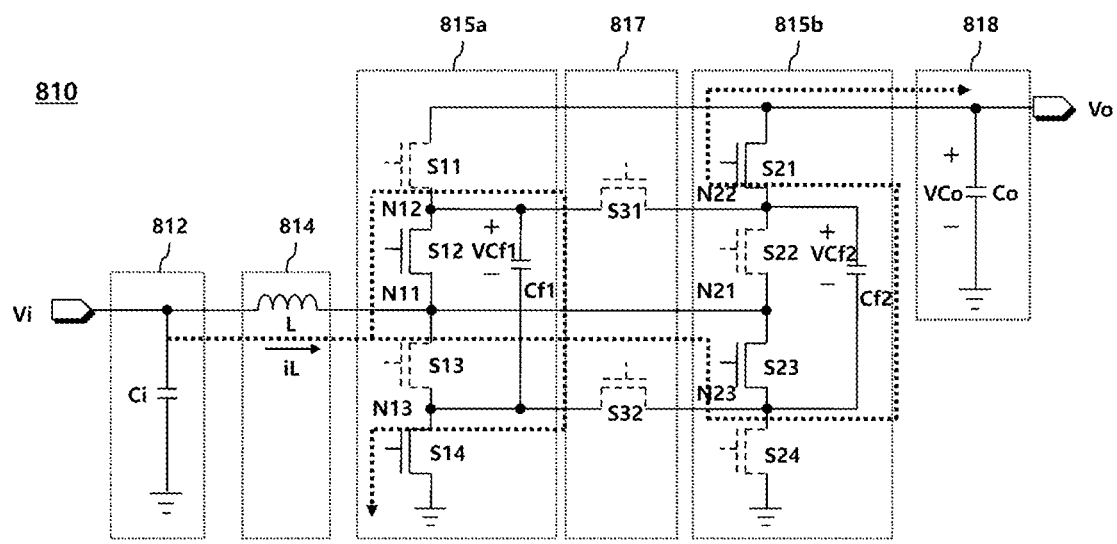
FIG. 12 is a fourth time interval state diagram illustrating the time at which the power stage according to the second example of the embodiment is controlled by the first control method.

FIG. 9 is a first time interval state diagram illustrating a time at which the power stage according to a second example of an embodiment is controlled by a first control method, and FIG. 10 is a second time interval state diagram illustrating the time at which the power stage according to the second example of the embodiment is controlled by the first control method. FIG. 11 is a third time interval state diagram illustrating the time at which the power stage according to the second example of the embodiment is controlled by the first control method, and FIG. 12 is a fourth time interval state diagram illustrating the time at which the power stage according to the second example of the embodiment is controlled by the first control method.

Referring to FIG. 9 to FIG. 12, a control unit (refer to reference numeral 120 in FIG. 6) may divide each control period sequentially into a first time interval (TP1), a second time interval (TP2), a third time interval (TP3), and a fourth time interval (TP4) so as to control the same.

The control unit (refer to reference numeral 120 in FIG. 6) may turn on the third switch S13, the fourth switch S14, the seventh switch S23, and the eighth switch S24 in the first time interval (TP1) and the third time interval (TP3) so as to build up current (iL) of the inductor L.

The control unit (refer to reference numeral 120 in FIG. 6) may turn off the first switch S11, the second switch S12, the fifth switch S21, and the sixth switch S22 in the first time interval (TP1) and the third time interval (TP3) so as to prevent the inductor current (iL) from flowing to the output capacitor Co and allow the first flying capacitor Cf1 and the second flying capacitor Cf2 to float.

The control unit (refer to reference numeral 120 in FIG. 6) may turn on the ninth switch S31 and the tenth switch S32 to allow electric charges of the first flying capacitor Cf1 and the second flying capacitor Cf2 to be shared.

The control unit (refer to reference numeral 120 in FIG. 6) may turn on the first switch S11 and the third switch S13 and may turn off the second switch S12 and the fourth switch S14 in the second time interval (TP2). According to this control, the inductor current (iL) may be transferred to the output capacitor Co while discharging the first flying capacitor Cf1.

The control unit (refer to reference numeral 120 in FIG. 6) may turn on the sixth switch S22 and the eighth switch S24 and may turn off the fifth switch S21 and the seventh switch S23 in the second time interval (TP2). According to this control, the inductor current (iL) may be transferred to the ground while charging the second flying capacitor Cf2.

The control unit (refer to reference numeral 120 in FIG. 6) may turn off the ninth switch S31 and the tenth switch S32 in the second time interval (TP2).

The control unit (refer to reference numeral 120 in FIG. 6) may turn on the second switch S12 and the fourth switch S14 and may turn off the first switch S11 and the third switch S13 in the fourth time interval (TP4). According to this control, the inductor current (iL) may be transferred to the ground while charging the first flying capacitor Cf1.

The control unit (refer to reference numeral 120 in FIG. 6) may turn on the fifth switch S21 and the seventh switch S23 and may turn off the sixth switch S22 and the eighth switch S24 in the fourth time interval (TP4). According to this control, the inductor current (iL) may be transferred to the output capacitor Co while discharging the second flying capacitor Cf2.

The control unit (refer to reference numeral 120 in FIG. 6) may turn off the ninth switch S31 and the tenth switch S32 in the fourth time interval (TP4).

According to the first control method, three or more voltage levels are generated in the first node N11 and the fourth node N21 that are connected to the inductor L. For example, a level of the ground voltage, a voltage level obtained by subtracting the voltage (Vcf1) of the first flying capacitor from the output voltage (Vo), and a voltage level obtained by adding the voltage (Vcf1) of the first flying capacitor to the ground level may be generated in the first node N11. Further, the level of the ground voltage, a voltage level obtained by subtracting the voltage (Vcf2) of the second flying capacitor from the output voltage (Vo), and a voltage level obtained by adding the voltage (Vcf2) of the second flying capacitor to the ground level may be generated in the fourth node N21.

This control method may be referred to as a multilevel step-up control, and the output voltage (Vo) may be at least two times higher than the input voltage (Vi) according to the first control method.

Figure 13:
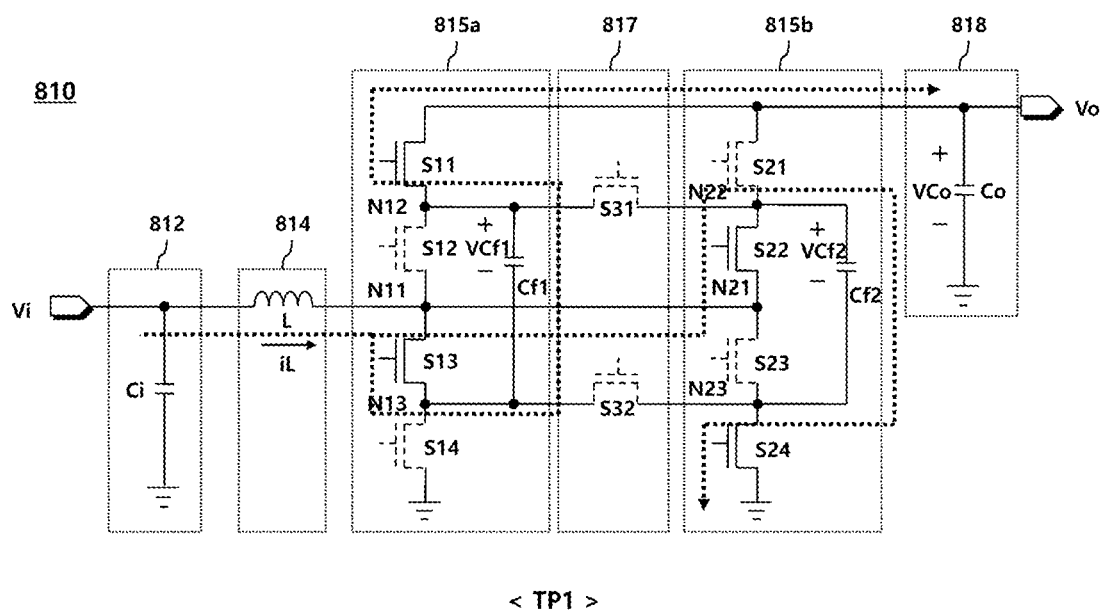
FIG. 13 is a first time interval state diagram illustrating a time at which the power stage according to the second example of the embodiment is controlled by a second control method.
Figure 14:
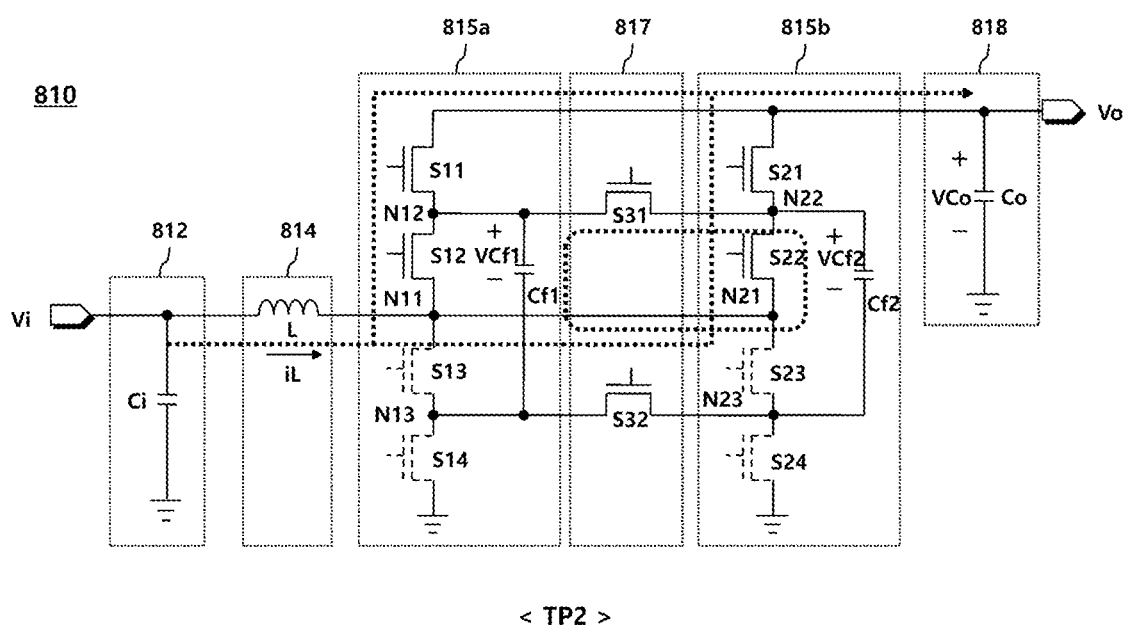
FIG. 14 is a second time interval state diagram illustrating the time at which the power stage according to the second example of the embodiment is controlled by the second control method.
Figure 15:
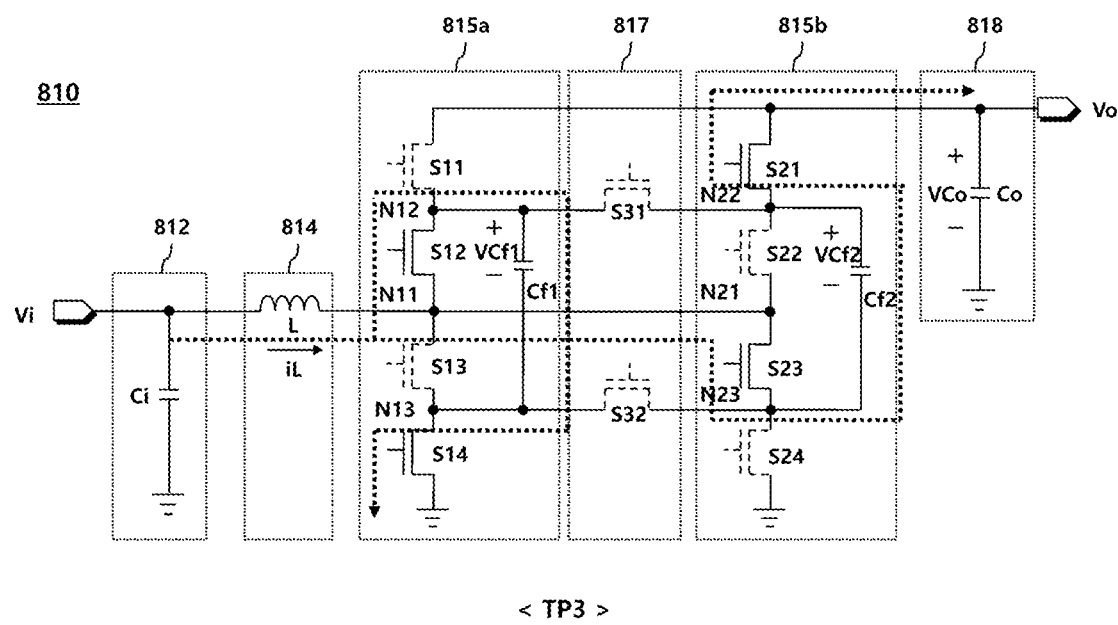
FIG. 15 is a third time interval state diagram illustrating the time at which the power stage according to the second example of the embodiment is controlled by the second control method.
Figure 16:
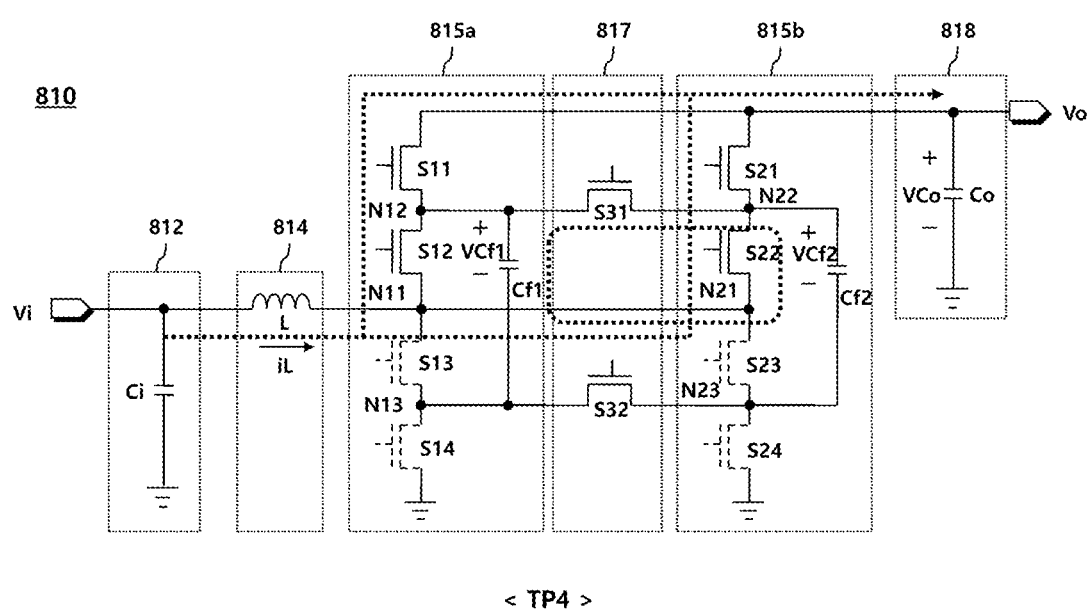
FIG. 16 is a fourth time interval state diagram illustrating the time at which the power stage according to the second example of the embodiment is controlled by the second control method.

FIG. 13 is a first time interval state diagram illustrating a time at which the power stage according to the second example of the embodiment is controlled by a second control method, and FIG. 14 is a second time interval state diagram illustrating the time at which the power stage according to the second example of the embodiment is controlled by the second control method. FIG. 15 is a third time interval state diagram illustrating the time at which the power stage according to the second example of the embodiment is controlled by the second control method, and FIG. 16 is a fourth time interval state diagram illustrating the time at which the power stage according to the second example of the embodiment is controlled by the second control method.

Referring to FIG. 13 to FIG. 16, a control unit (refer to reference numeral 120 in FIG. 6) may divide each control period sequentially into a first time interval (TP1), a second time interval (TP2), a third time interval (TP3), and a fourth time interval (TP4) so as to control the same.

The control unit (refer to reference numeral 120 in FIG. 6) may turn on the first switch S11 and the third switch S13 and may turn off the second switch S12 and the fourth switch S14 in the first time interval (TP1). According to this control, the inductor current (iL) may be transferred to the output capacitor Co while discharging the first flying capacitor Cf1.

The control unit (refer to reference numeral 120 in FIG. 6) may turn on the sixth switch S22 and the eighth switch S24 and may turn off the fifth switch S21 and the seventh switch S23 in the first time interval (TP1). According to this control, the inductor current (iL) may be transferred to the ground while charging the second flying capacitor Cf2.

The control unit (refer to reference numeral 120 in FIG. 6) may turn off the ninth switch S31 and the tenth switch S32 in the first time interval (TP1).

The control unit (refer to reference numeral 120 in FIG. 6) may turn on the first switch S11, the second switch S12, the fifth switch S21, and the sixth switch S22 in the second time interval (TP2) and the fourth time interval (TP4).

The control unit (refer to reference numeral 120 in FIG. 6) may turn off the third switch S13, the fourth switch S14, the seventh switch S23, and the eighth switch S24 in the second time interval (TP2) and the fourth time interval (TP4) so as to prevent the inductor current (iL) from flowing to the ground and allow the first flying capacitor Cf1 and the second flying capacitor Cf2 to float.

The control unit (refer to reference numeral 120 in FIG. 6) may turn on the ninth switch S31 and the tenth switch S32 to allow electric charges of the first flying capacitor Cf1 and the second flying capacitor Cf2 to be shared.

The control unit (refer to reference numeral 120 in FIG. 6) may turn on the second switch S12 and the fourth switch S14 and may turn off the first switch S11 and the third switch S13 in the third time interval (TP3). According to this control, the inductor current (iL) may be transferred to the ground while charging the first flying capacitor Cf1.

The control unit (refer to reference numeral 120 in FIG. 6) may turn on the fifth switch S21 and the seventh switch S23 and may turn off the sixth switch S22 and the eighth switch S24 in the third time interval (TP3). According to this control, the inductor current (iL) may be transferred to the output capacitor Co while discharging the second flying capacitor Cf2.

The control unit (refer to reference numeral 120 in FIG. 6) may turn off the ninth switch S31 and the tenth switch S32 in the third time interval (TP3).

According to the second control method, three or more voltage levels are generated in the first node N11 and the fourth node N21 that are connected to the inductor L. For example, a level of the output voltage (Vo), a voltage level obtained by subtracting the voltage (Vcf1) of the first flying capacitor from the output voltage (Vo), and a voltage level obtained by adding the voltage (Vcf1) of the first flying capacitor to the ground level may be generated in the first node N11 and the fourth node N21. Further, the level of the output voltage (Vo), a voltage level obtained by subtracting the voltage (Vcf2) of the second flying capacitor from the output voltage (Vo), and a voltage level obtained by adding the voltage (Vcf2) of the second flying capacitor to the ground level may be generated in the fourth node N21.

According to the second control method, the output voltage (Vo) may be equal to or higher than the input voltage (Vi) and lower than twice the input voltage (Vi).

According to the first control method and the second control method, the charging/discharging balance of the flying capacitor may be efficiently controlled.

Figure 17:
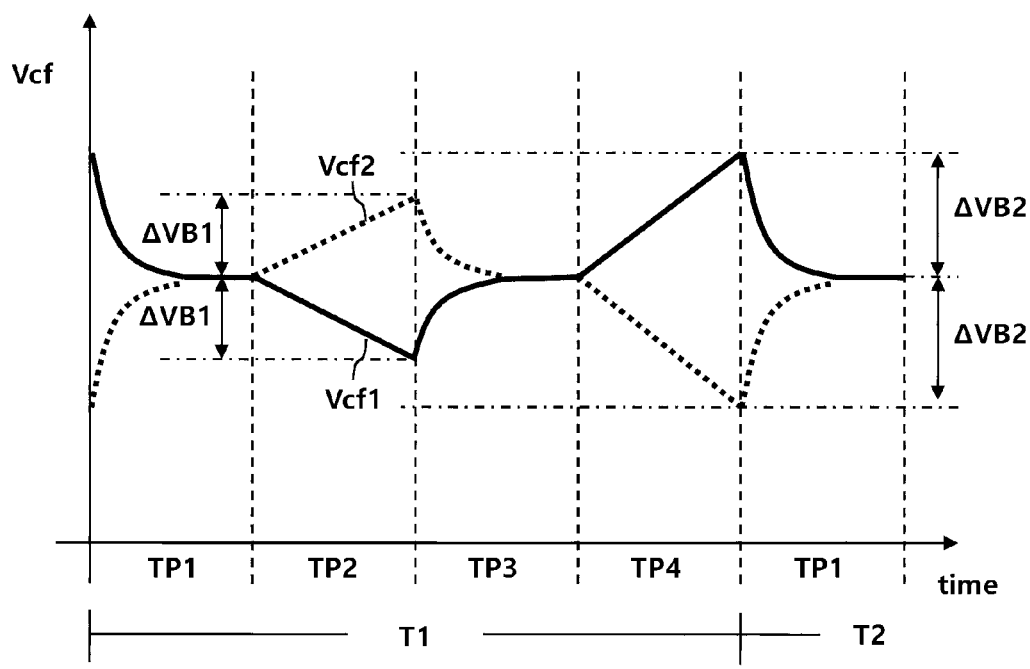
FIG. 17 is a diagram illustrating that the charging/discharging balance is maintained in a situation in which a charging amount and a discharging amount of the flying capacitor do not match.

FIG. 17 is a diagram illustrating that the charging/discharging balance is maintained in a situation in which a charging amount and a discharging amount of the flying capacitor do not match.

Referring to FIG. 17, in the second time interval (TP2), the voltage (Vcf1) of the first flying capacitor is decreasing, while the first flying capacitor is being discharged, and the voltage (Vcf2) of the second flying capacitor is increasing while the second flying capacitor is being charged. In the fourth time interval (TP4), the voltage (Vcf1) of the first flying capacitor is increasing, while the first flying capacitor is being charged, and the voltage (Vcf2) of the second flying capacitor is decreasing while the second flying capacitor is being discharged.

However, for the first flying capacitor, a charging amount is greater than a discharging amount, and therefore an increased voltage (ΔVB2) is greater than a decreased voltage (ΔVB1). Further, for the second flying capacitor, a discharging amount is greater than a charging amount, and therefore a decreased voltage (ΔVB2) is greater than an increased voltage (ΔVB1). In this case, conventionally, voltage of a flying capacitor changes in each control period. However, according to an embodiment, in a time interval in which a flying capacitor is floated, for example, the first time interval (TP1) and the third time interval (TP3), the charging/discharging balance may be maintained by allowing electric charges of multiple flying capacitors to be shared.

Figure 18:
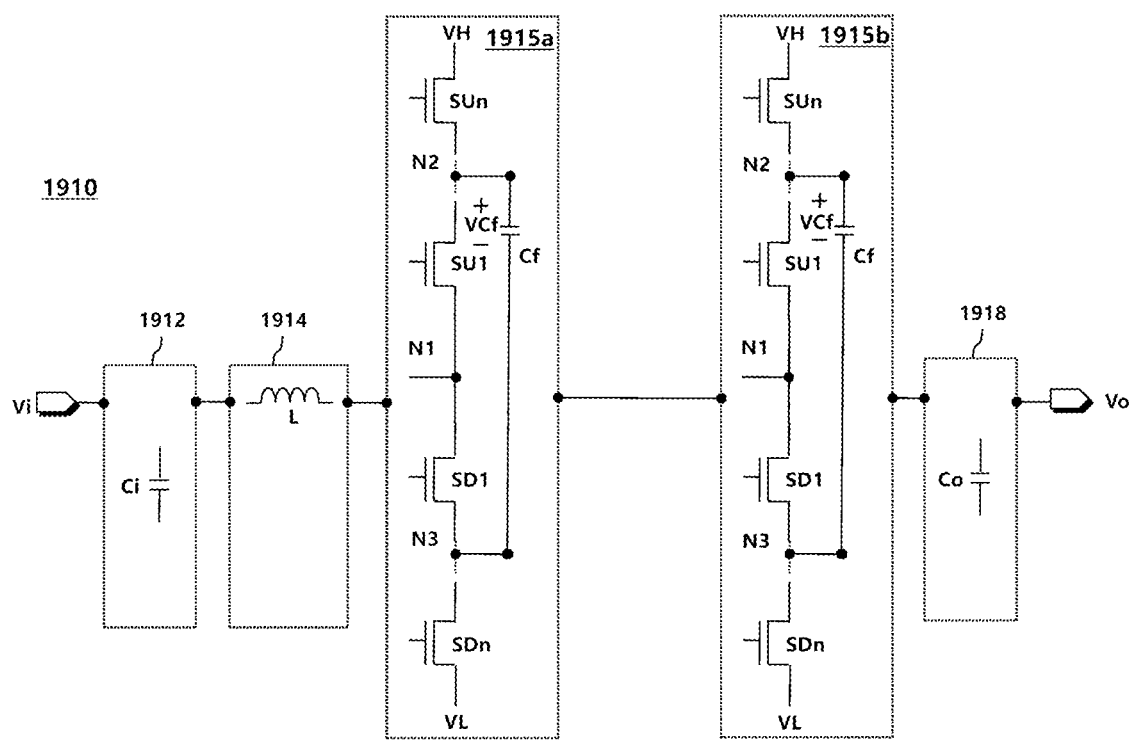
FIG. 18 is a first exemplary configuration diagram illustrating a power stage of a step-up converter according to another embodiment.

FIG. 18 is a first exemplary configuration diagram illustrating a power stage of a step-up converter according to another embodiment.

Referring to FIG. 18, a power stage 1910 may include an input unit 1912, an inductor unit 1914, a plurality of power switch units 1915a and 1915b, a connection switch unit, an output unit 1918, and the like.

The input unit 1912 may include at least one input capacitor Ci. An input voltage (Vi) is supplied to one side of the input capacitor Ci, and the other side of the input capacitor Ci may be connected to the ground.

The inductor unit 1914 may include at least one inductor L. One side of the inductor unit 1914 is connected to the input unit 1912, and the input voltage (Vi) may be received from the input unit 1912.

The power switch units 1915a and 1915b may include at least four serially connected power switches SU1 to SUn and SD1 to SDn. The power switch units 1915a and 1915b may include at least two power switches SU1 to SUn on the high voltage side and may include at least two power switches SD1 to SDn on the low voltage side with respect to a first node N1 connected to the inductor unit 1914.

One end of the at least four serially connected power switches SU1 to SUn and SD1 to SDn may be connected to a high voltage (VH) and the other end thereof may be connected to a low voltage (VL). The high voltage (VH) may be an output voltage (Vo) and the low voltage (VL) may be the ground voltage. In the present specification, the ground voltage may be understood as an example of the low voltage (VL) described above.

One side of the inductor unit 1914 may be connected to the input unit 1912, and the other side may be connected to the first node N1 of the power switch unit 1915a or 1915b. For example, one side of the inductor L included in the inductor unit 1914 may be connected to the input unit 1912, and the other side may be connected to the first node N1 of the power switch unit 1915a or 1915b.

The power switch unit 1915a or 1915b may include at least one flying capacitor Cf. The flying capacitor Cf may be connected in parallel to at least two power switches among the at least four power switches SU1 to SUn and SD1 to SDn included in the power switch unit 1915a or 1915b. For example, both ends of the flying capacitor Cf may be connected to a second node N2 formed between the at least two power switches SU1 to SUn disposed on the high voltage side, and may be connected to a third node N3 formed between the at least two power switches SD1 to SDn disposed on the low voltage side with respect to the first node N1. According to this connection, the flying capacitor Cf may be connected in parallel to a plurality of switches disposed between the second node N2 and the third node N3. Further, the first node N1 formed between the switches connected in parallel to the flying capacitor Cf may be connected to the other side of the inductor unit 1914.

The output unit 1918 may include an output capacitor Co. An output voltage (Vo) is supplied to one side of the output capacitor Co, and the other side of the output capacitor Co may be connected to the ground.

The control unit (refer to reference numeral 120 in FIG. 6) may control the plurality of power switch units 1915a and 1915b so as to convert the input voltage (Vi) into the output voltage (Vo).

The control unit (refer to reference numeral 120 in FIG. 6) may control, in each control period, the plurality of power switch units 1915a and 1915b so that voltage of the first node N1 changes four times or more.

As a first exemplary control, the control unit (refer to reference numeral 120 in FIG. 6) may generate a low voltage (VL) in the first node N1 in the first time interval, and may generate, in the first node N1, voltage obtained by subtracting the voltage (Vcf) of the flying capacitor from a high voltage (VH) in the second time interval. The control unit (refer to reference numeral 120 in FIG. 6) may generate the low voltage (VL) in the first node N1 in the third time interval, and may generate, in the first node N1, voltage obtained by adding the voltage (Vcf) of the flying capacitor to the low voltage (VL) in the fourth time interval. Herein, the high voltage (VH) may be the output voltage (Vo) and the low voltage (VL) may be the ground voltage.

As a second exemplary control, the control unit (refer to reference numeral 120 in FIG. 6) may generate a low voltage (VL) in the first node N1 in the first time interval, and may generate, in the first node N1, voltage obtained by adding the voltage (Vcf) of the flying capacitor to the low voltage (VL) in the second time interval. The control unit (refer to reference numeral 120 in FIG. 6) may generate the low voltage (VL) in the first node N1 in the third time interval, and may generate, in the first node N1, voltage obtained by subtracting the voltage (Vcf) of the flying capacitor from the high voltage (VH) in the fourth time interval. Herein, the high voltage (VH) may be the output voltage (Vo) and the low voltage (VL) may be the ground voltage.

As a third exemplary control, the control unit (refer to reference numeral 120 in FIG. 6) may generate voltage obtained by subtracting the voltage (Vcf) of the flying capacitor from a high voltage (VH) in the first node N1 in the first time interval, and may generate the high voltage (VH) in the first node N1 in the second time interval. The control unit (refer to reference numeral 120 in FIG. 6) may generate, in the first node N1, voltage obtained by adding the voltage (Vcf) of the flying capacitor to a low voltage (VL) in the third time interval, and may generate the high voltage (VH) in the first node N1 in the fourth time interval. Herein, the high voltage (VH) may be the output voltage (Vo) and the low voltage (VL) may be the ground voltage.

As a fourth exemplary control, the control unit (refer to reference numeral 120 in FIG. 6) may generate, in the first node N1, voltage obtained by adding the voltage (Vcf) of the flying capacitor to a low voltage (VL) in the first time interval, and may generate a high voltage (VH) in the first node N1 in the second time interval. The control unit (refer to reference numeral 120 in FIG. 6) may generate, in the first node N1, voltage obtained by subtracting the voltage (Vcf) of the flying capacitor from the high voltage (VH) in the third time interval, and may generate the high voltage (VH) in the first node N1 in the fourth interval. Herein, the high voltage (VH) may be the output voltage (Vo) and the low voltage (VL) may be the ground voltage.

The control unit (refer to reference numeral 120 in FIG. 6) may control the direction of a charging/discharging current of the floating capacitor Cf differently with respect to the plurality of power switch units 1915*a* and 1915*b*.

For example, the control unit (refer to reference numeral 120 in FIG. 6) may allow the flying capacitor Cf to be discharged in the second time interval by controlling the first power switch unit 1915*a* in the same manner as that described in the first exemplary control, and may allow the flying capacitor Cf to be charged in the second time interval by controlling the second power switch unit 1915*b* in the same manner as that described in the second exemplary control.

The control unit (refer to reference numeral 120 in FIG. 6) may allow the flying capacitor Cf to be charged in the fourth time interval by controlling the first power switch unit 1915*a* in the same manner as that described in the first exemplary control, and may allow the flying capacitor Cf to be discharged in the fourth time interval by controlling the second power switch unit 1915*b* in the same manner as that described in the second exemplary control.

Depending on a control method, the control unit (refer to reference numeral 120 in FIG. 6) may control the voltage (Vcf) of the flying capacitor to be ½ of the output voltage (Vo).

The control unit (refer to reference numeral 120 in FIG. 6) may control the plurality of power switch units 1915*a* and 1915*b* in at least two modes among a plurality of modes in each control period.

For example, among a plurality of modes, a first mode may be a mode for generation of a low voltage (VL) in first nodes N1 of the plurality of power switch units 915*a* and 1915*b*, and a second mode may be a mode for generation of voltage obtained by subtracting voltage (Vcf) of the flying capacitor from a high voltage (VH) in the first node N1 of the first power switch unit 1915*a* among the plurality of power switch units 915*a* and 1915*b*, and generation of voltage obtained by adding the voltage (Vcf) of the flying capacitor to the low voltage (VL) in the first node N1 of the second power switch unit 1915*b*. For example, among the plurality of modes, a third mode may be a mode for generation of voltage obtained by adding the voltage (Vcf) of the flying capacitor to the low voltage (VL) in the first node N1 of the first power switch unit 1915*a* among the plurality of power switch units 915*a* and 1915*b*, and generation of voltage obtained by subtracting the voltage (Vcf) of the flying capacitor from the high voltage (VH) in the first node N1 of the second power switch unit 1915*b*, and a fourth mode may be a mode for generation of the high voltage (VH) in the first node N1 of the plurality of power switch units 915*a* and 1915*b*.

For example, the control unit (refer to reference numeral 120 in FIG. 6) may control, in the first control period, the plurality of power switch units 915*a* and 1915*b* in order of the first mode, the second mode, and the first mode and second mode. Alternatively, the control unit (refer to reference numeral 120 in FIG. 6) may control, in the first control period, the plurality of power switch units 915*a* and 1915*b* in order of the first mode, the third mode, and the first mode and third mode.

The control unit (refer to reference numeral 120 in FIG. 6) may control to compare the voltages (Vcf) of the flying capacitors of the plurality of power switch units 915*a* and 1915*b*, respectively, and may perform control so that a mode in which a flying capacitor Cf, the voltage (Vcf) of which is relatively high, is discharged and a flying capacitor Cf, the voltage (Vcf) of which is relatively low, is charged, is included more often than an opposite mode thereof. Here, the opposite mode is a mode in which a flying capacitor Cf, the voltage (Vcf) of which is relatively high, is charged and a flying capacitor Cf, the voltage (Vcf) of which is relatively low, is discharged.

For example, the control unit (refer to reference numeral 120 in FIG. 6) may charge at least one flying capacitor Cf of the first power switch unit 1915*a* and may discharge at least one flying capacitor Cf of the second power switch unit 1915*b* in one mode, and may discharge at least one flying capacitor Cf of the first power switch unit 1915*a* and may charge at least one flying capacitor Cf of the second power switch unit 1915*b* in another mode. At this time, if the voltage (Vcf) of at least one flying capacitor of the first power switch unit 1915*a* is higher than the voltage (Vcf) of at least one flying capacitor of the second power switch unit 1915*b*, the control unit (refer to reference numeral 120 in FIG. 6) may perform control in one control period so that the one mode is not applied or an application time of the another mode is longer than an application time of the one mode.

The second mode is a mode in which the flying capacitor Cf of the second power switch unit 1915*a* is charged and the first power switch unit 1915*a* is discharged, and the third mode is a mode in which the flying capacitor Cf of the first power switch unit 1915*a* is charged and the second power switch unit 1915*b* is discharged.

When the voltage (Vcf) of the flying capacitor of the first power switch unit 1915*a* is higher than the voltage (Vcf) of the flying capacitor of the second power switch unit 1915*b*, the control unit (refer to reference numeral 120 in FIG. 6) may control, in each control period, the plurality of power switch units 1915*a* and 1915*b* in a sequence of the first mode, the second mode, and the first mode and second mode, or may control, in each control period, the plurality of power switch units 1915*a* and 1915*b* in a sequence of the second mode, the fourth mode, and the second mode and fourth mode.

When the voltage (Vcf) of the flying capacitor of the second power switch unit 1915*b* is higher than the voltage (Vcf) of the flying capacitor of the first power switch unit 1915*a*, the control unit (refer to reference numeral 120 in FIG. 6) may control, in each control period, the plurality of power switch units 1915*a* and 1915*b* in a sequence of the first mode, the third mode, and the first mode and second mode, or may control, in each control period, the plurality of power switch units 1915*a* and 1915*b* in a sequence of the third mode, the fourth mode, and the third mode and fourth mode.

When a difference between the voltages (Vcf) of the flying capacitors of the plurality of power switch units 1915*a* and 1915*b* falls within a predetermined range, the control unit (refer to reference numeral 120 in FIG. 6) may select and apply randomly or irregularly a mode in which the flying capacitors Cf of the plurality of the power switch units 1915*a* and 1915*b* are charged or discharged.

For example, the control unit (refer to reference numeral 120 in FIG. 6) may control the plurality of the power switch units 1915a and 1915b in the sequence of the first mode, the second mode, and the first mode and third mode in the first control period, and may control the plurality of the power switch units 1915a and 1915b in the sequence of the first mode, the third mode, and the first mode and second mode in the second control period. At this time, in at least two control periods, the number of times of charging and discharging, which is applied to the flying capacitors Cf of the power switch units 1915a and 1915b, respectively, may be the same.

The control unit (refer to reference numeral 120 in FIG. 6) may charge at least one flying capacitor Cf of the first power switch unit 1915a and may discharge at least one flying capacitor Cf of the second power switch unit 1915b in one mode, and may discharge at least one flying capacitor Cf of the first power switch unit 1915a and may charge at least one flying capacitor Cf of the second power switch unit 1915b in another mode. When a difference between the voltage (Vcf) of at least one flying capacitor of the first power switch unit 1915a and the voltage (Vcf) of at least one flying capacitor of the second power switch unit 1915b falls within a predetermined range, the control unit (refer to reference numeral 120 in FIG. 6) may control a sequence, time, or frequency for applying one mode and another mode in the first control period and the second control period to be different, wherein the application time or application frequency of the one mode and another mode may be controlled to be the same in the plurality of control periods including the first control period and the second control period.

For this control, the control unit (refer to reference numeral 120 in FIG. 6) may further include a circuit for measurement or comparison of the voltages (Vcf) of the flying capacitors of the plurality of power switch units 1915a and 1915b, respectively.

Figure 19:
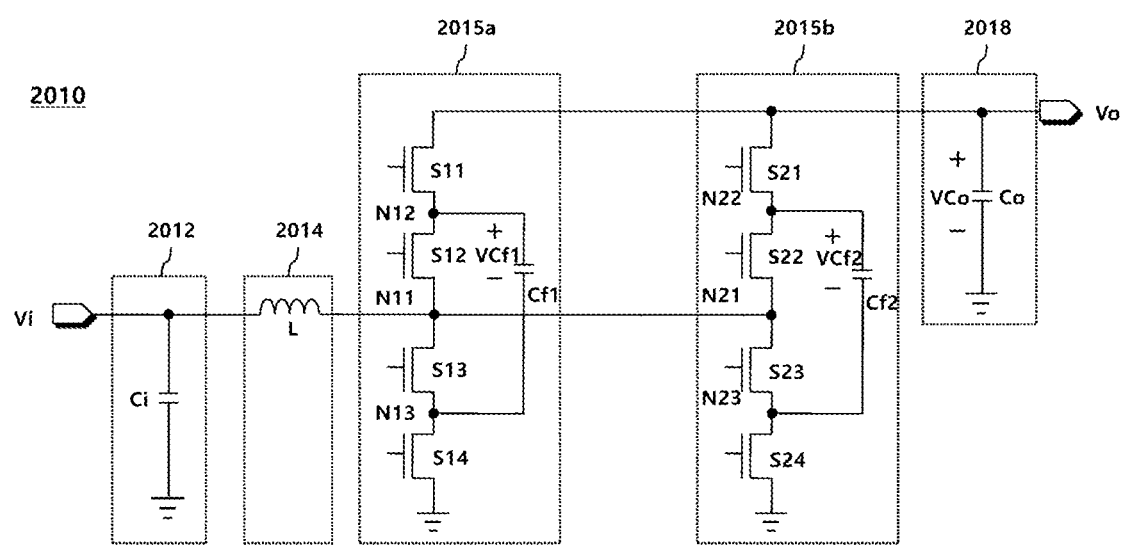
FIG. 19 is a second exemplary configuration diagram illustrating the power stage of the step-up converter according to another embodiment.

FIG. 19 is a second exemplary configuration diagram illustrating the power stage of the step-up converter according to another embodiment.

Referring to FIG. 19, a power state 2010 may include an input unit 2012, an inductor unit 2014, a first switch unit 2015a, a second switch unit 2015b, an output unit 2018, and the like.

The input unit 2012 may include at least one input capacitor Ci. An input voltage (Vi) is supplied to one side of the input capacitor Ci, and the other side of the input capacitor Ci may be connected to the ground.

The output unit 2018 may include at least one output capacitor Co. An output voltage (Vo) is supplied to one side of the output capacitor Co, and the other side of the output capacitor Co may be connected to the ground.

The inductor unit 2014 may include at least one inductor L. One side of the inductor unit L may be connected to the input capacitor Ci so as to receive an input voltage (Vi), and the other side of the inductor unit (L) may be connected to a first node N11 and a fourth node N21.

The first switch unit 2015a may include four serially connected switches S11 to S14. The first switch unit 2015a may include a first flying capacitor Cf1 connected in parallel to the second switch S12 and the third switch S13.

One side of the first switch S11 may be connected to an output capacitor Co and the other side may be connected to the second node N12. One side of the second switch S12 may be connected to the second node N12, and the other side may be connected to the first node N11. One side of the third switch S13 may be connected to the first node N11, and the other side may be connected to a third node N13. One side of the fourth switch S14 may be connected to the third node N13, and the other side may be connected to the ground.

The second switch unit 2015b may include four serially connected switches S21 to S24. The second switch unit 815b may include a second flying capacitor Cf2 connected in parallel to a sixth switch S22 and a seventh switch S23.

One side of the fifth switch S21 may be connected to the output capacitor Co and the other side may be connected to a fifth node N22. One side of the sixth switch S22 may be connected to the fifth node N22, and the other side may be connected to the fourth node N21. One side of the seventh switch S23 may be connected to the fourth node N21, and the other side may be connected to a sixth node N23. One side of an eighth switch S24 may be connected to the sixth node N23, and the other side may be connected to the ground.

Figure 20:
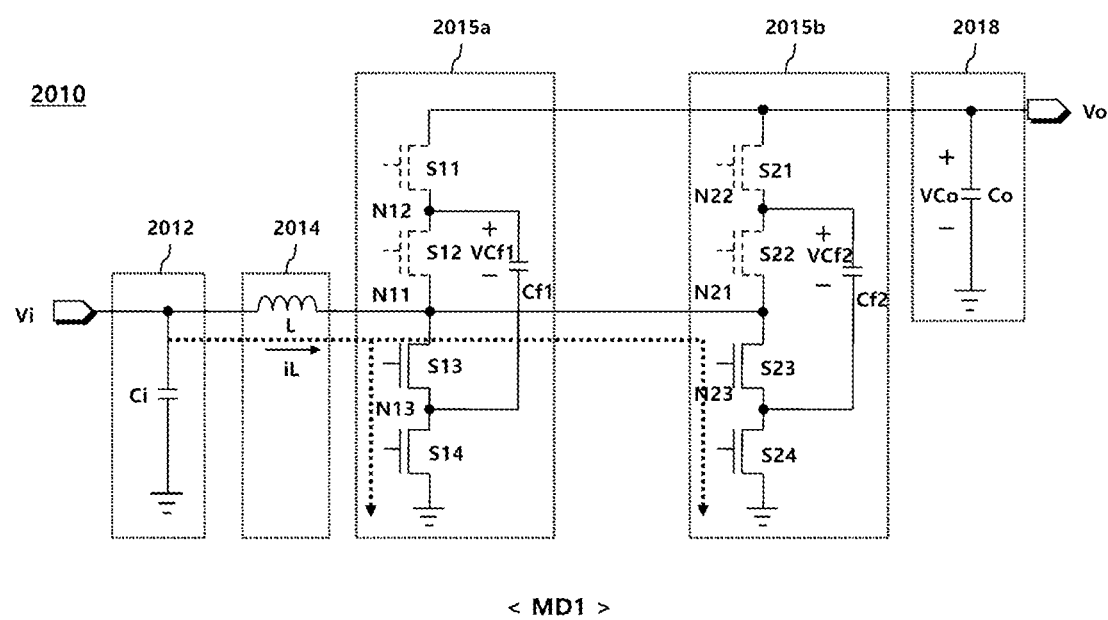
FIG. 20 is a state diagram illustrating a time at which the power stage according to a second example of another embodiment is controlled in a first mode.
Figure 21:
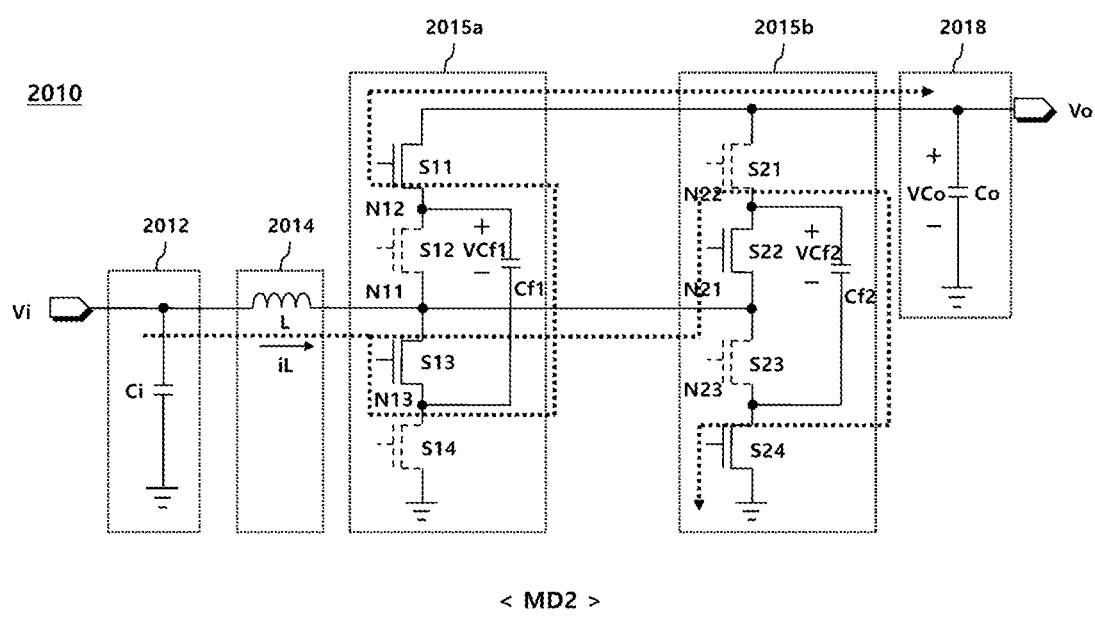
FIG. 21 is a state diagram illustrating a time at which the power stage according to the second example of another embodiment is controlled in a second mode.
Figure 22:
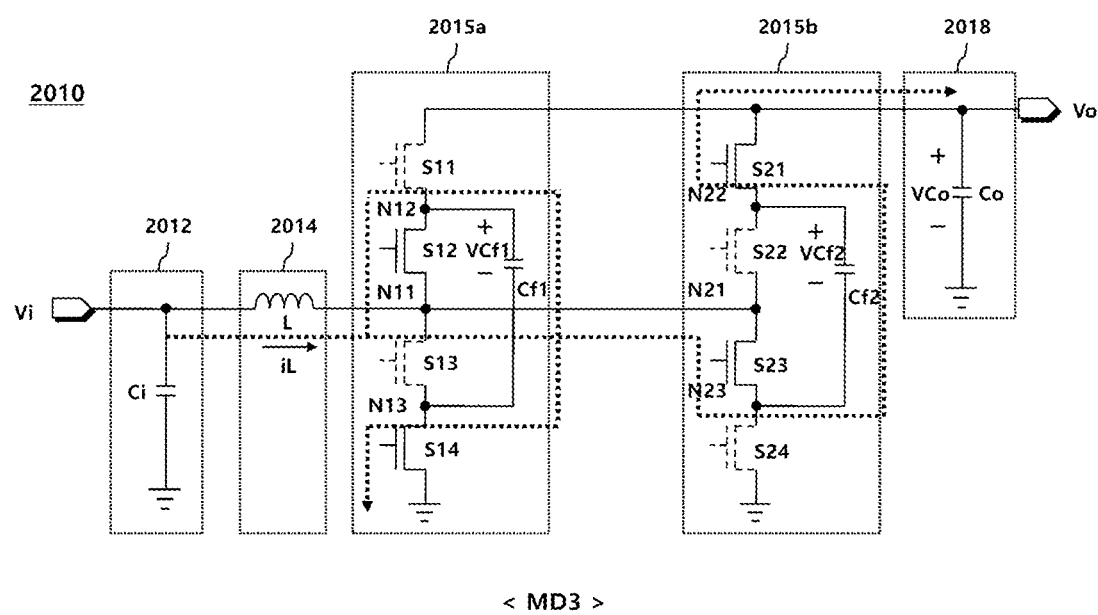
FIG. 22 is a state diagram illustrating a time at which the power stage according to the second example of another embodiment is controlled in a third mode.
Figure 23:
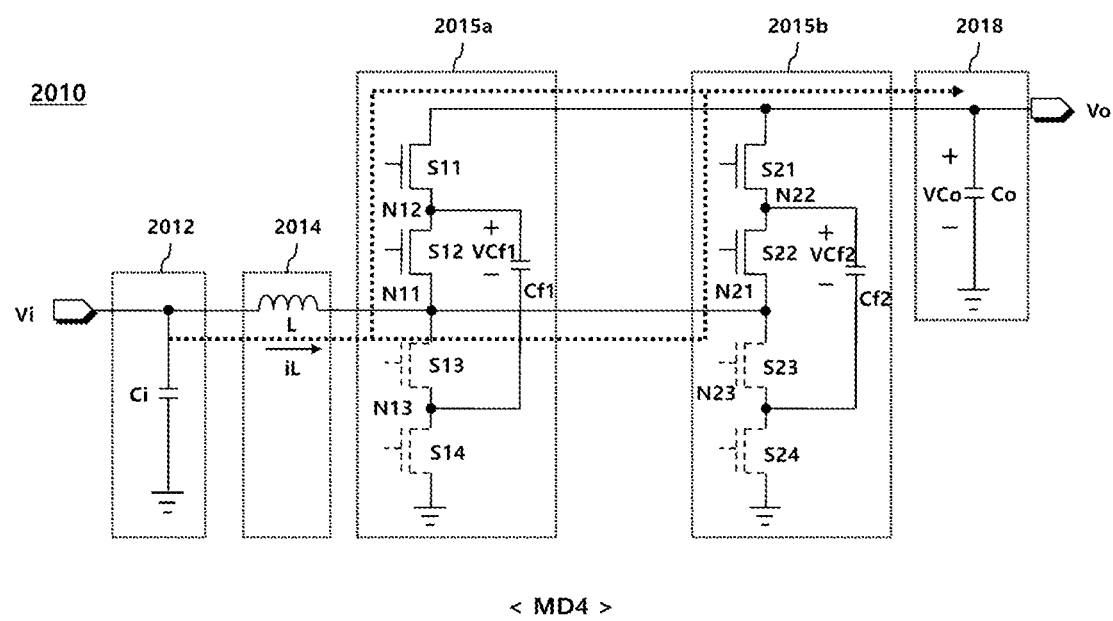
FIG. 23 is a state diagram illustrating a time at which the power stage according to the second example of another embodiment is controlled in a fourth mode.

FIG. 20 is a state diagram illustrating a time at which the power stage according to a second example of another embodiment is controlled in a first mode, FIG. 21 is a state diagram illustrating a time at which the power stage according to the second example of another embodiment is controlled in a second mode, FIG. 22 is a state diagram illustrating a time at which the power stage according to the second example of another embodiment is controlled in a third mode, and FIG. 23 is a state diagram illustrating a time at which the power stage according to the second example of another embodiment is controlled in a fourth mode.

Referring to FIG. 20, a control unit (refer to reference numeral 120 in FIG. 6) may turn on the third switch S13, the fourth switch S14, the seventh switch S23, and the eighth switch S24 in a first mode (MD1), so as to build up current (iL) of the inductor L.

In the first mode (MD1), the control unit (refer to reference numeral 120 in FIG. 6) may turn off the first switch S11, the second switch S12, the fifth switch S21, and the sixth switch S22 so as to prevent the inductor current (iL) from flowing to the output capacitor Co, and allow the first flying capacitor Cf1 and the second flying capacitor Cf2 to be floated.

Referring to FIG. 21, the control unit (refer to reference numeral 120 in FIG. 6) may turn on the first switch S11 and the third switch S13 and may turn off the second switch S12 and the fourth switch S14, in a second time mode (MD2). According to this control, the inductor current (iL) may be transferred to the output capacitor Co while discharging the first flying capacitor Cf1.

The control unit (refer to reference numeral 120 in FIG. 6) may turn on the sixth switch S22 and the eighth switch S24 and may turn off the fifth switch S21 and the seventh switch S23 in the second time mode (MD2). According to this control, the inductor current (iL) may be transferred to the ground while charging the second flying capacitor Cf2.

Referring to FIG. 22, the control unit (refer to reference numeral 120 in FIG. 6) may turn on the second switch S12 and the fourth switch S14 and may turn off the first switch S11 and the third switch S13, in a third time mode (MD3). According to this control, the inductor current (iL) may be transferred to the ground while charging the first flying capacitor Cf1.

The control unit (refer to reference numeral 120 in FIG. 6) may turn on the fifth switch S21 and the seventh switch S23 and may turn off the sixth switch S22 and the eighth switch S24 in the third time mode (MD3). According to this control, the inductor current (iL) may be transferred to the output capacitor Co while discharging the second flying capacitor Cf2.

Referring to FIG. 23, a control unit (refer to reference numeral 120 in FIG. 6) may turn on the first switch S11, the second switch S12, the fifth switch S21, and the sixth switch S22 in a fourth mode (MD4). In the fourth mode (MD4), the control unit (refer to reference numeral 120 in FIG. 6) may turn off the third switch S13, the fourth switch S14, the seventh switch S23, and the eighth switch S24 so as to prevent the inductor current (iL) from flowing to the ground, and allow the first flying capacitor Cf1 and the second flying capacitor Cf2 to be floated.

The control unit (refer to reference numeral 120 in FIG. 6) may compare the voltage (Vcf1) of the first flying capacitor with the voltage (Vcf2) of the second flying capacitor, and may perform control so that modes to be applied to the respective control periods are different depending on a comparison result.

FIG. 24 is a diagram illustrating an example of a mode applied to the power stage according to the second example of another embodiment.

Referring to FIG. 24, in the first control method, i.e., a method for controlling an output control (Vo) to be two times higher than an input voltage (Vin), when the voltage (Vcf1) of the first flying capacitor is higher than the voltage (Vcf2) of the second flying capacitor, a control unit (refer to reference numeral 120 in FIG. 6) may perform control so that the third mode (MD3) is not applied or an application time of the second mode (MD2) is longer than an application time of the third mode (MD3) in the first control period (T1) and the second control period (T2). Here, the second mode (MD2) is a mode in which the first flying capacitor is discharged and the second flying capacitor is charged, and the third mode (MD3) is a mode in which the first flying capacitor is charged and the second flying capacitor is discharged.

In the first control method, when the voltage (Vcf1) of the first flying capacitor is lower than the voltage (Vcf2) of the second flying capacitor, the control unit (refer to reference numeral 120 in FIG. 6) may perform control so that the second mode (MD2) is not applied or an application time of the third mode (MD3) is longer than an application time of the second mode (MD2) in the first control period (T1) and the second control period (T2).

In the first control method, when a difference between the voltage (Vcf1) of the first flying capacitor and the voltage (Vcf2) of the second flying capacitor falls within a predetermined range, the control unit (refer to reference numeral 120 in FIG. 6) may control a sequence, time, or frequency of applying the second mode (MD2) and the third mode (MD3) in the first control period (T1) and the second control period (T2) to be different. For example, in the first control period (T1), the control unit (refer to reference numeral 120 in FIG. 6) may apply the second mode (MD2) in the second time interval (TP2) and may apply the third mode (MD3) in the fourth time interval (TP4). Further, in the second control period (T2), the control unit (refer to reference numeral 120 in FIG. 6) may apply the third mode (MD3) in the second time interval (TP2), and may apply the second mode (MD2) in the fourth time interval (TP4). As another example, the control unit (refer to reference numeral 120 in FIG. 6) may apply the second mode (MD2) in the second time interval (TP2) and the fourth time interval (TP4) in the first control period (T1), and may apply the third mode (MD3) in the second time interval (TP2) and the fourth time interval (TP4) in the second control period (T2).

In the first control method, the control unit (refer to reference numeral 120 in FIG. 6) may apply the first mode (MD1) described with reference to FIG. 21, in a time interval in which the flying capacitor is floated.

In the second control method, i.e., a method for controlling the output control (Vo) to be higher than the input voltage (Vin) and lower than twice the input voltage (Vin), when the voltage (Vcf1) of the first flying capacitor is higher than the voltage (Vcf2) of the second flying capacitor, the control unit (refer to reference numeral 120 in FIG. 6) may perform control so that the third mode (MD3) is not applied or an application time of the second mode (MD2) is longer than an application time of the third mode (MD3) in the first control period (T1) and the second control period (T2).

In the second control method, when the voltage (Vcf1) of the first flying capacitor is lower than the voltage (Vcf2) of the second flying capacitor, the control unit (refer to reference numeral 120 in FIG. 6) may perform control so that the second mode (MD2) is not applied or an application time of the third mode (MD3) is longer than an application time of the second mode (MD2) in the first control period (T1) and the second control period (T2).

In the second control method, when a difference between the voltage (Vcf1) of the first flying capacitor and the voltage (Vcf2) of the second flying capacitor falls within a predetermined range, the control unit (refer to reference numeral 120 in FIG. 6) may control a sequence, time, or frequency of applying the second mode (MD2) and the third mode (MD3) in the first control period (T1) and the second control period (T2) to be different. For example, in the first control period (T1), the control unit (refer to reference numeral 120 in FIG. 6) may apply the second mode (MD2) in the first time interval (TP1) and may apply the third mode (MD3) in the third time interval (TP3). Further, in the second control period (T2), the control unit (refer to reference numeral 120 in FIG. 6) may apply the third mode (MD3) in the first time interval (TP1), and may apply the second mode (MD2) in the third time interval (TP3). As another example, the control unit (refer to reference numeral 120 in FIG. 6) may apply the second mode (MD2) in the first time interval (TP1) and the third time interval (TP3) in the first control period (T1), and may apply the third mode (MD3) in the first time interval (TP1) and the third time interval (TP3) in the second control period (T2).

In the second control method, the control unit (refer to reference numeral 120 in FIG. 6) may apply the fourth mode (MD4) described with reference to FIG. 24, in a time interval in which the flying capacitor is floated.

In the another embodiment described above, the voltages of the flying capacitors are compared to control modes differently, and such a control may be applied to the embodiment described above.

For example, in the first example of the embodiment described with reference to FIG. 7, the control unit may charge at least one flying capacitor of the first power switch unit and may discharge at least one flying capacitor of the second power switch unit in one mode, and may discharge at least one flying capacitor of the first power switch unit and may charge at least one flying capacitor of the second power switch unit in another mode. At this time, if voltage of the at least one flying capacitor of the first power switch unit is higher than voltage of the at least one flying capacitor of the second power switch unit, the control unit may perform control so that the one mode is not applied in one control period or an application time of the another mode is longer than an application time of the one mode. The control unit may control a sequence, time, or frequency of applying the one mode and the another mode to be different in the first control period and the second control period, and may control the time or frequency of applying the one mode and the another mode to be the same in a plurality of control periods including the first control period and the second control period.

As another example, in the second example of the embodiment described with reference to FIG. 8, the control unit may charge the first flying capacitor of the first switch unit and may discharge the second flying capacitor of the second switch unit in one mode, and may discharge the first flying capacitor of the first switch unit and may charge the second flying capacitor of the second switch unit in another mode. At this time, if voltage of the first flying capacitor is lower than voltage of the second flying capacitor, the control unit may perform control so that the another mode is not applied in one control period or an application time of the one mode is longer than an application time of the another mode. Further, when a difference between the voltage of the first flying capacitor and the voltage of the second flying capacitor falls within a predetermined range, the control unit may control a sequence, time, or frequency for applying the one mode and the another mode to be different in the first control period and the second control period, and may control the time or frequency of applying the one mode and the another to be the same in the plurality of control periods including the first control period and the second control period.

As described above, according to the embodiments, the charging/discharging balance of flying capacitors used in the step-up converter can be easily controlled.

Since terms, such as "including," "comprising," and "having" mean that corresponding elements may exist unless they are specifically described to the contrary, it shall be construed that other elements can be additionally included, rather than that such elements are omitted. All technical, scientific or other terms are used consistently with the meanings as understood by a person skilled in the art unless defined to the contrary. Common terms as found in dictionaries should be interpreted in the context of the related technical writings, rather than overly ideally or impractically, unless the present disclosure expressly defines them so.

Although a preferred embodiment of the present disclosure has been described for illustrative purposes, those skilled in the art will appreciate that various modifications, additions and substitutions are possible, without departing from the scope and spirit of the embodiment as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A step-up converter comprising:
    an inductor unit configured to receive an input voltage in one side thereof and include at least one inductor;
    a plurality of power switch units including at least four serially connected power switches and including at least one flying capacitor connected in parallel to at least two power switches among the at least four power switches, wherein one node between the at least two power switches is connected to another side of the inductor unit;
    a connection switch unit including a plurality of connection switches configured to connect the at least one flying capacitor of a first power switch unit and the at least one flying capacitor of a second power switch unit from among the plurality of power switch units; and
    a control unit configured to control the first power switch unit and the second power switch unit to convert the input power into an output voltage, and allow electric charges of the at least one flying capacitor of the first power switch unit and the at least one flying capacitor of the second power switch unit to be shared in a time interval,
    wherein the at least one flying capacitor of the first power switch unit is charged and the at least one flying capacitor of the second power switch unit is discharged in a first time interval of each control period, and the electric charges of the at least one flying capacitor of the first power switch unit and the at least one flying capacitor of the second power switch unit are shared in a second time interval subsequent to the first time interval.

2. The step-up converter of claim 1, wherein the control unit controls the plurality of power switch units so that voltage of the one node changes four times or more in each control period.

3. The step-up converter of claim 1, wherein the at least one flying capacitor of the first power switch unit is discharged and the least one flying capacitor of the second power switch unit is charged in a third time interval of each control period, and the electric charges of the at least one flying capacitor of the first power switch unit and the at least one flying capacitor of the second power switch unit are shared in a fourth time interval subsequent to the third time interval.

4. The step-up converter of claim 3, wherein a charging amount of the at least one flying capacitor of the first power switch unit in the first time interval and a discharging amount of the at least one flying capacitor of the first power switch unit in the third time interval do not match.

5. The step-up converter of claim 1, wherein a voltage corresponding to ½ of the output voltage is generated in the at least one flying capacitor in the time interval in which the electric charges of the at least one flying capacitor are shared.

6. The step-up converter of claim 1, wherein:
    the at least one flying capacitor of the first power switch unit is charged and the at least one flying capacitor of the second power switch unit is discharged in one mode, and the at least one flying capacitor of the first power switch unit is discharged and the at least one flying capacitor of the second power switch unit is charged in another mode; and
    when voltage of the at least one flying capacitor of the first power switch unit is higher than voltage of the at least one flying capacitor of the second power switch unit, the control unit performs control so that the one mode is not applied or an application time of the another mode is longer than an application time of the one mode in one control period.

7. A step-up converter comprising:
    an inductor unit configured to receive an input voltage in one side thereof and include at least one inductor;
    a plurality of power switch units including at least four serially connected power switches and including at least one flying capacitor connected in parallel to at least two power switches among the at least four power switches, wherein one node between the at least two power switches is connected to another side of the inductor unit;

a connection switch unit including a plurality of connection switches configured to connect the at least one flying capacitor of a first power switch unit and the at least one flying capacitor of a second power switch unit from among the plurality of power switch units; and a control unit configured to control the first power switch unit and the second power switch unit to convert the input power into an output voltage, and allow electric charges of the at least one flying capacitor of the first power switch unit and the at least one flying capacitor of the second power switch unit to be shared in a time interval, wherein:

the at least one flying capacitor of the first power switch unit is charged and the at least one flying capacitor of the second power switch unit is discharged in one mode, and the at least one flying capacitor of the first power switch unit is discharged and the at least one flying capacitor of the second power switch unit is charged in another mode; and the control unit controls a sequence, time, or frequency of applying the one mode and the another mode to be different in a first control period and a second control period, wherein the control unit controls an application time or application frequency of the one mode and the another mode to be a same in a plurality of control periods including the first control period and the second control period.

8. A step-up converter comprising:

an inductor unit configured to receive an input voltage in one side thereof and include at least one inductor;

a first switch unit including a first switch, a second switch, a third switch, and a fourth switch that are serially connected, and including a first flying capacitor connected in parallel to the second switch and the third switch, wherein one node between the second switch and the third switch is connected to the inductor unit;

a second switch unit including a fifth switch, a sixth switch, a seventh switch, and an eighth switch that are serially connected, and including a second flying capacitor connected in parallel to the sixth switch and the seventh switch, wherein another node between the sixth switch and the seventh switch is connected to the inductor unit;

a third switch unit including a ninth switch and a tenth switch that connect both ends of the first flying capacitor and the second flying capacitor; and a control unit configured to control the first switch unit and the second switch unit to convert the input voltage into an output voltage, and allow electric charges of the first flying capacitor and the second flying capacitor to be shared in a time interval, wherein the first switch and the fifth switch are connected to an output capacitor, the fourth switch and the eighth switch are connected to ground, and the control unit divides each control period into a first time interval, a second time interval, a third time interval, and a fourth time interval and sequentially controls the intervals, wherein the control unit: turns on the third switch, the fourth switch, the seventh switch, the eighth switch, the ninth switch, and the tenth switch and turns off the first switch, the second switch, the fifth switch, and the sixth switch, in the first time interval and the third time interval; turns on the first switch, the third switch, the sixth switch, and the eighth switch and turns off the second switch, the fourth switch, the fifth switch, the seventh switch, the ninth switch, and the tenth switch, in the second time interval; and turns on the second switch, the fourth switch, the fifth switch, and the seventh switch and turns off the first switch, the third switch, the sixth switch, the eighth switch, the ninth switch, and the tenth switch, in the fourth time interval.

9. The step-up converter of claim 8, wherein a ground voltage and the output voltage are generated at both ends of the first switch unit, a first flying capacitor voltage is generated in the first flying capacitor, and the control unit controls the first switch unit to generate, in the one node, a voltage having multiple levels including a level of the ground voltage, a level obtained by subtracting the first flying capacitor voltage from the output voltage, and a level obtained by adding the first flying capacitor voltage to the ground voltage.

10. The step-up converter of claim 9, wherein, when voltage of the level of the ground voltage is generated in the one node, the control unit controls the third switch unit to allow the electric charges of the first flying capacitor and the second flying capacitor to be shared.

11. The step-up converter of claim 8, wherein a ground voltage and the output voltage are generated at both ends of the first switch unit, a first flying capacitor voltage is generated in the first flying capacitor, and the control unit controls the first switch unit to generate, in the one node, a voltage of multiple levels including a level of the output voltage, a level obtained by subtracting the first flying capacitor voltage from the output voltage, and a level obtained by adding the first flying capacitor voltage to the ground voltage.

12. A step-up converter comprising:

an inductor unit configured to receive an input voltage in one side thereof and include at least one inductor;

a first switch unit including a first switch, a second switch, a third switch, and a fourth switch that are serially connected, and including a first flying capacitor connected in parallel to the second switch and the third switch, wherein one node between the second switch and the third switch is connected to the inductor unit;

a second switch unit including a fifth switch, a sixth switch, a seventh switch, and an eighth switch that are serially connected, and including a second flying capacitor connected in parallel to the sixth switch and the seventh switch, wherein another node between the sixth switch and the seventh switch is connected to the inductor unit;

a third switch unit including a ninth switch and a tenth switch that connect both ends of the first flying capacitor and the second flying capacitor; and a control unit configured to control the first switch unit and the second switch unit to convert the input voltage into an output voltage, and allow electric charges of the first flying capacitor and the second flying capacitor to be shared in a time interval, wherein the first switch and the fifth switch are connected to an output capacitor, the fourth switch and the eighth switch are connected to ground, and the control unit divides each control period into a first time interval, a second time interval, a third time interval, and a fourth time interval and sequentially controls the intervals, wherein the control unit: turns on the first switch, the third switch, the sixth switch, and the eighth switch and turns off the second switch, the fourth switch, the fifth switch, the seventh switch, the ninth switch, and the tenth switch, in the first time interval; turns on the second switch, the fourth switch, the fifth switch, and the seventh switch, and turns off the first switch, the third switch, the sixth switch, the eighth switch, the ninth switch, and the tenth switch, in the third time interval; and turns on the first switch, the second switch, the fifth switch, the sixth switch, the ninth switch, and the tenth switch and turns off the third switch, the fourth switch, the seventh switch, and the eighth switch, in the second time interval and the fourth time interval.

13. The step-up converter of claim 12, wherein: the first flying capacitor of the first switch unit is charged, and the second flying capacitor of the second switch unit is discharged, in one mode; the first flying capacitor of the first switch unit is discharged and the second flying capacitor of the second switch unit is charged, in another mode; and when voltage of the first flying capacitor is lower than voltage of the second flying capacitor, the control unit performs control so that the another mode is not applied or an application time of the one mode is longer than an application time of the another mode, in one control period.

14. The step-up converter of claim 12, wherein: the first flying capacitor of the first switch unit is charged and the second flying capacitor of the second switch unit is discharged, in one mode; and the first flying capacitor of the first switch unit is discharged and the second flying capacitor of the second switch unit is charged, in another mode; and when a difference between voltage of the first flying capacitor and voltage of the second flying capacitor falls within a predetermined range, the control unit controls a sequence, time, or frequency of applying the one mode and the another mode to be different in a first control period and a second control period, wherein the control unit controls an application time or application frequency of the one mode and the another mode to be identical in a plurality of control periods including the first control period and the second control period.

15. A step-up converter comprising:
an inductor unit configured to receive an input voltage in one side thereof and include at least one inductor;
a plurality of power switch units including at least four serially connected power switches and including at least one flying capacitor connected in parallel to at least two power switches among the at least four power switches, wherein one node between the at least two power switches is connected to another side of the inductor unit; and
a control unit configured to: control a first power switch unit and a second power switch unit to convert the input voltage into an output voltage; allow the at least one flying capacitor of the first power switch unit to be charged and the at least one flying capacitor of the second power switch unit to be discharged in one mode; allow the at least one flying capacitor of the first power switch unit to be discharged and the at least one flying capacitor of the second power switch unit to be charged, in another mode; and when voltage of the at least one flying capacitor of the first switch unit is higher than voltage of the at least one flying capacitor of the second power switch unit, perform control so that the one mode is not applied or an application time of the another mode is longer than an application time of the one mode, in one control period.

16. The step-up converter of claim 15, wherein, when a difference between voltage of the at least one flying capacitor of the first power switch unit and voltage of the at least one flying capacitor of the second power switch unit falls within a predetermined range, the control unit controls a sequence, time, or frequency of applying the one mode and the another mode to be different in a first control period and a second control period, wherein the control unit controls the application time or application frequency of the one mode and the another mode to be identical in a plurality of control periods including the first control period and the second control period.

* * * * *